United States Patent
Miyagawa et al.

(10) Patent No.: US 11,022,535 B2
(45) Date of Patent: Jun. 1, 2021

(54) PARTICULATE MATTER DETECTION SENSOR

(71) Applicant: DENSO CORPORATION, Kariya (JP)

(72) Inventors: Go Miyagawa, Kariya (JP); Takashi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 305 days.

(21) Appl. No.: 16/029,824

(22) Filed: Jul. 9, 2018

(65) Prior Publication Data

US 2019/0033195 A1 Jan. 31, 2019

(30) Foreign Application Priority Data

Jul. 27, 2017 (JP) .............................. JP2017-145313

(51) Int. Cl.
*G01N 15/06* (2006.01)
*F01N 11/00* (2006.01)
*G01N 15/00* (2006.01)

(52) U.S. Cl.
CPC ..... *G01N 15/0656* (2013.01); *G01N 15/0606* (2013.01); *F01N 11/00* (2013.01); *G01N 2015/0046* (2013.01)

(58) Field of Classification Search
CPC .................................................. G01N 15/0656
See application file for complete search history.

(56) References Cited

U.S. PATENT DOCUMENTS

| 2008/0024111 | A1 | 1/2008 | Dorfmueller et al. |
| 2012/0047993 | A1* | 3/2012 | Tokuda .............. G01N 15/0606 73/23.33 |
| 2015/0253233 | A1 | 9/2015 | Brueck et al. |
| 2016/0223432 | A1* | 8/2016 | Kubinski ........... G01N 15/0656 |
| 2017/0131185 | A1 | 5/2017 | Koike et al. |
| 2017/0146430 | A1* | 5/2017 | Zhang ..................... F01N 9/002 |
| 2017/0315042 | A1 | 11/2017 | Miyagawa et al. |

FOREIGN PATENT DOCUMENTS

| JP | 2012-078130 | 4/2012 |
| WO | 2016/178505 A1 | 11/2016 |

* cited by examiner

*Primary Examiner* — Herbert K Roberts
(74) *Attorney, Agent, or Firm* — Nixon & Vanderhye P.C.

(57) ABSTRACT

A PM detection sensor has a sensor body part made of an insulating member and a positive electrode and a negative electrode. The positive electrode is composed of a plurality of positive electrode segments. The negative electrode is composed of a plurality of negative electrode segments. A deposition surface is formed on the sensor body part. These electrode segments are formed on the deposition surface to be exposed to exhaust gas introduced into the inside of the PM detection sensor. The positive electrode segments and the negative electrode segments are arranged adjacently to and separately from each other, on the deposition surface, along a short width direction and a long width direction of each electrode segment. The short width direction and the long width direction are orthogonal to a normal direction of the deposition surface.

7 Claims, 20 Drawing Sheets ical matter contained in exhaust gas emitted from an internal combustion engine, and capable of reducing the variation of the detection sensitivity due to the variation of the flow direction of the exhaust gas.

PARTICULATE MATTER DETECTION SENSOR

CROSS-REFERENCE TO RELATED APPLICATION

This application is related to and claims priority from Japanese Patent Application No. 2017-145313 filed on Jul. 27, 2017, the contents of which are hereby incorporated by reference.

BACKGROUND OF THE INVENTION

1. Field of the Invention

The present invention relates to particulate matter detection sensors capable of detecting an amount of particulate matter contained in exhaust gas emitted from an internal combustion engine.

2. Description of the Related Art

Particulate matter detection sensors and particulate matter filters such as diesel particulate filters (DPF) have been used in exhaust gas purification systems, etc. A particulate matter detection sensor (hereinafter, the PM detection sensor) detects the amount of particulate matter (hereinafter, PM) contained in exhaust gas emitted from an internal combustion engine. In general, the PM detection sensor is mounted on an exhaust gas pipe of an internal combustion engine at a downstream side of a particulate matter filter (hereinafter, the PM filter) in the exhaust gas pipe. The PM detection sensor has a sensor body part made of an insulating member and a pair of electrodes formed on a first surface, i.e. on a deposition surface of the sensor body part. Patent document 1, Japanese patent laid open publication No. 2016-03927, discloses such a PM detection sensor.

The surface of the sensor body part, on which the pair of electrodes are formed, is called to a deposition surface. On the deposition surface of the sensor body part, PM contained in exhaust gas is attracted, deposited and accumulated on the deposition surface by generated electric fields. The pair of electrodes are arranged at a predetermined interval on the deposition surface of the sensor body part.

That is, when a direct current voltage (i.e. DC voltage) is applied to the pair of electrodes, the electric fields is generated between the pair of electrodes. Because PM contained in exhaust gas has been weakly charged due to collision with ions and friction with an internal wall of the exhaust gas pipe, and due to adjacent PM flowing in the exhaust gas pipe, when the electric field is generated between the pair of electrodes, PM is attracted onto the deposition surface by an electrostatic force provided by the generated electric field. Finally, PM is deposited on the deposition surface formed on the surface of the sensor body part. Further, PM is electrically conductive.

When PM is accumulated and deposited on the deposition surface of the sensor body part, a PM bridge part composed of bonded PM is formed between the pair of electrodes arranged on the ion surface, a current flows between the pair of electrodes. A magnitude of the current corresponds to the amount of PM deposited between the pair of electrodes. The PM sensor having the structure previously described detects the magnitude of the current flowing between the pair of electrodes, and a control device detects the amount of PM contained in exhaust gas on the basis of the magnitude of the current detected by the PM sensor.

However, the PM detection sensor having a conventional structure previously described has room for improvement on a PM detection sensitivity. FIG. 23 is a partial enlarged view of a PM detection sensor as a comparative example having a conventional electrode arrangement of depositing particulate matter. In the conventional electrode arrangement in the PM detection sensor shown in FIG. 23, each electrode has a short width and a long length continuously formed along the overall area of a deposition surface on a sensor body part. An electric field generated on a pair of a positive electrode $3_P$ and a negative electrode $3_N$ has a uniform strength, and PM is uniformly deposited on the overall surface of the deposition surface on the sensor body part.

FIG. 24 is a view showing a PM bridge part composed of bonded PM formed between the positive electrode $3_P$ and the negative electrode $3_N$ in the PM detection sensor shown in FIG. 23 when exhaust gas flows in the Y direction which is orthogonal to the X direction. As shown in FIG. 24, bonded PM forms the PM bridge part through which the positive electrode $3_P$ is electrically connected to the negative electrode $3_N$ together. The PM detection sensitivity of the PM detection sensor is varied due to the flow direction of exhaust gas g. As shown in FIG. 24, when the flow direction of exhaust gas g coincides with the direction of the generated electric field, the PM bridge part 80 is easily formed between the pair of the positive electrode $3_P$ and the negative electrode $3_N$ along the direction of the electric field. This quickly forms the electric conduction between the pair of the positive electrode $3_P$ and the negative electrode $3_N$. In the structure shown in FIG. 24, the PM detection sensor detects that the exhaust gas contains a large amount of PM.

FIG. 25 is a view showing a case in which no PM bridge part is formed between the positive electrode $3_P$ and the negative electrode $3_N$ in the PM detection sensor according to the comparative example when exhaust gas g flows in the X direction. As shown in FIG. 25, when the flow direction of the exhaust gas g is orthogonal to the direction of the generated electric field (as the Y direction), it is difficult to rapidly generate a PM bridge part along the flow direction of exhaust gas g, and a long period of time is necessary to generate the electric conduction between the pair of the positive electrode $3_P$ and the negative electrode $3_N$. In this case, the PM detection sensor detects that a less amount of PM is contained in the exhaust gas g.

In the conventional electrode arrangement in the PM detection sensor previously described, because the generated electric field has the same intensity on the overall deposition surface of the sensor body part, it is difficult to generate a strong force and to locally deposit a high concentration of PM on specific areas on the deposition surface of the sensor body part, and difficult to easily generate PM bridge parts composed of bonded PM along the flow direction of exhaust gas. This means that the PM detection sensitivity of a PM detection sensor easily varies due to the change of the flow direction of exhaust gas.

SUMMARY

It is therefore desired to provide a particulate matter detection sensor having an improved electrode arrangement capable of increasing a PM detection sensitivity for detecting an amount of particulate matter contained in exhaust gas emitted from an internal combustion engine, and capable of reducing the variation of the detection sensitivity due to the variation of the flow direction of the exhaust gas.

An exemplary embodiment provides a particulate matter detection sensor capable of detecting an amount of particulate matter contained in exhaust gas emitted from an internal combustion engine. The particulate matter detection sensor has a sensor body part and two types of electrodes. The sensor body part is made of an insulating member. A deposition surface is formed on a surface of the sensor body part. The two types of electrodes are a positive electrode and a negative electrode formed on the deposition surface to be exposed to exhaust gas as a detection target introduced into the particulate matter detection sensor.

The positive electrode is composed of a plurality of positive electrode segments. The negative electrode is composed of a plurality of negative electrode segments. The positive electrode segments and the negative electrode segments are arranged adjacently and dispersedly to (i.e. separately from) each other on the deposition surface in at least a first direction and a second direction. The first direction is orthogonal to a normal direction of the deposition surface. Similarly, the second direction is orthogonal to the normal direction of the deposition surface.

In the particulate matter detection sensor according to the present invention having the improved electrode arrangement previously described, the positive electrode segments and the negative electrode segments are arranged adjacently and alternately on the deposition surface (as a first surface) of the sensor body part in at least two specific directions. The short width direction and the long width direction are orthogonal to a normal direction of the deposition surface.

The structure of the improved electrode arrangement makes it possible to enhance the detection sensitivity of the particulate matter detection sensor for detecting an amount of particulate matter contained in the exhaust gas. That is, the improved electrode arrangement previously described generates an electric field having a relatively high intensity at the parts at which the positive electrode segments and the negative electrode segments are arranged adjacently to each other, and generates an electric field having a relatively low intensity at the remaining parts on the deposition surface at which the positive electrode segments and the negative electrode segments are not arranged adjacently to each other. This improved electrode arrangement makes it possible to form the parts having a high electric field intensity and the parts having a low electric field intensity on the deposition surface of the sensor body part. Particulate matter is easily attracted and deposited, and particulate matter bridge parts are formed on the parts having a high electric field intensity on the deposition surface of the sensor body part. The particulate matter bridge parts are generated on the parts having a high electric field intensity. This improved electrode arrangement allows the current to easily flow within a short time between the positive electrode segments and the negative electrode segments, and enhances the PM detection sensitivity of the particulate matter detection sensor.

In the improved electrode arrangement according to the present invention, because the parts having a high electric field intensity are generated at the specific parts on the deposition surface, this electrode arrangement generates a strong attraction force at the specific parts to attract particulate matter strongly, and to quickly grow the particulate matter bridge parts regardless of the relationship between the flow direction of the exhaust gas and the direction of the generated electric fields on the deposition surface of the sensor body part. This electrode arrangement makes it possible to reduce the influence of variation of the flow direction of the exhaust gas to the particulate matter detection sensitivity of the particulate matter detection sensor.

The present invention provides the particulate matter detection sensor having an excellent detection sensitivity for detecting an amount of particulate matter contained in exhaust gas regardless of variation of the flow direction of exhaust gas.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
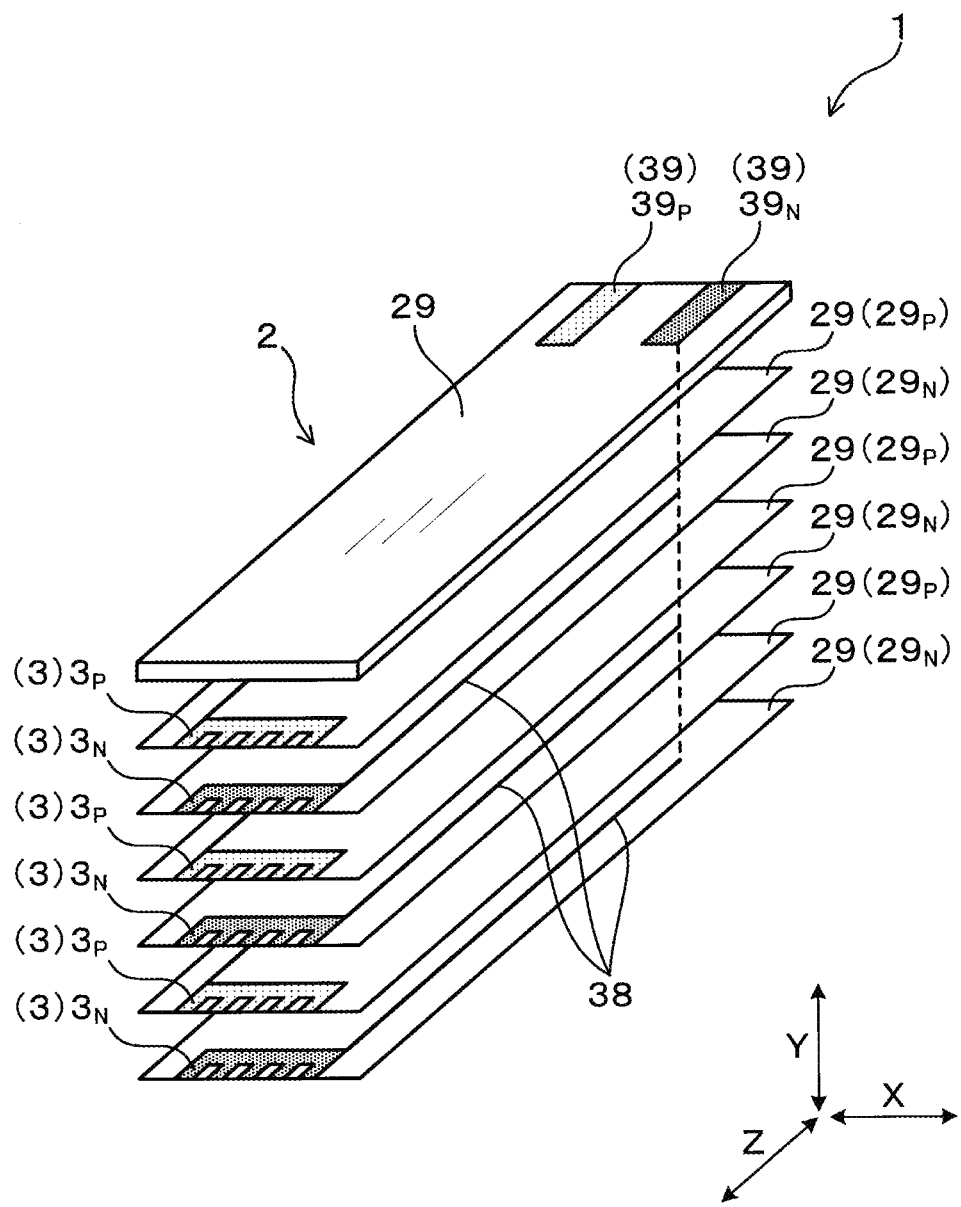
FIG. 1 is an exploded perspective view showing a PM detection sensor according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a particulate matter detection sensor (hereinafter, the PM detection sensor) according to a first exemplary embodiment with reference to FIG. 1 to FIG. 7.

The PM detection sensor 1 according to the first exemplary embodiment is mounted to an exhaust gas pipe 71 (see FIG. 7) connected to an internal combustion engine 7 (see FIG. 7, hereinafter, the engine 7) so as to detect an amount of particulate matter 8 (hereinafter, PM 8) contained in exhaust gas g emitted from the engine 7.

Figure 2:
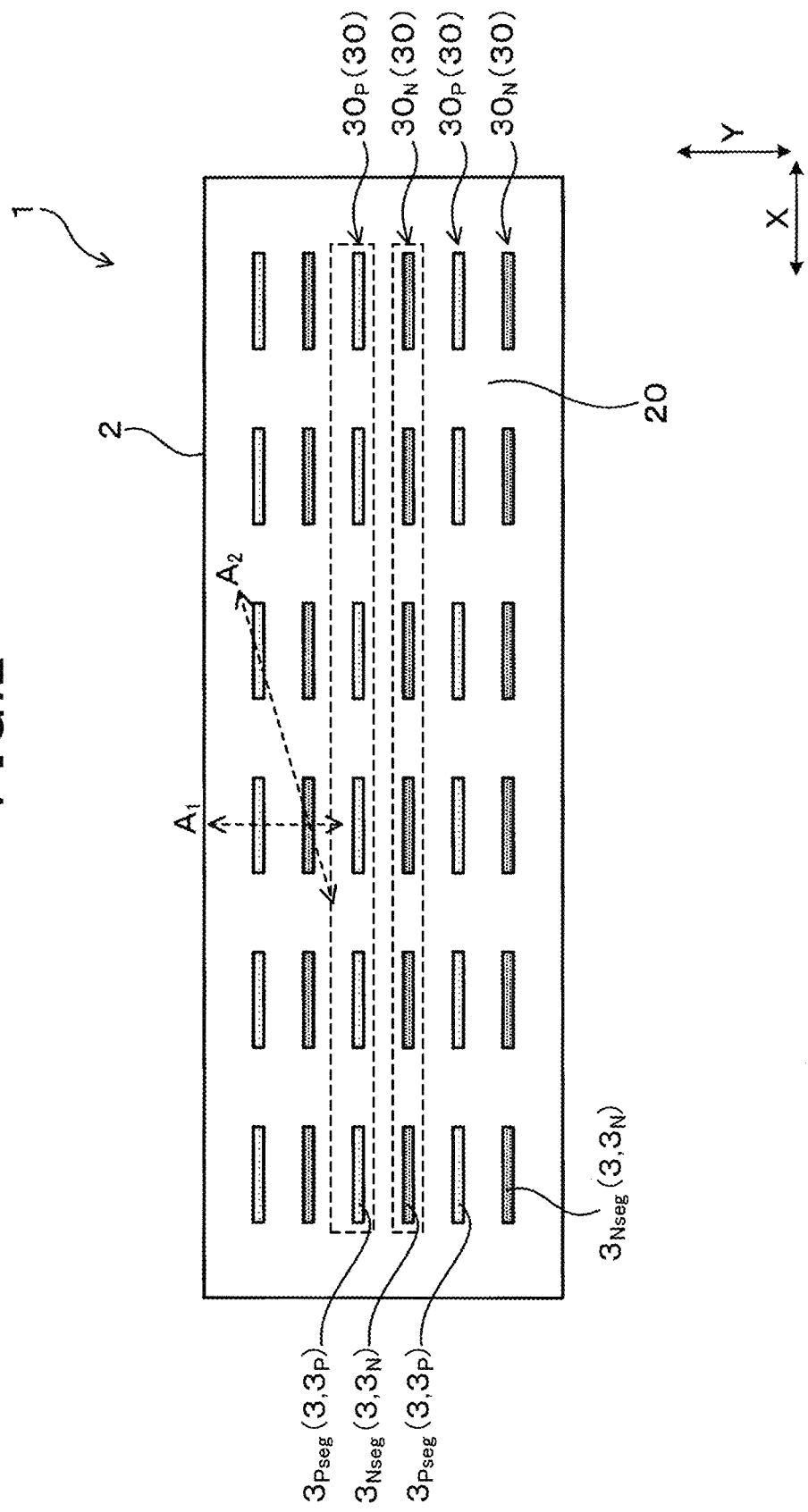
FIG. 2 is a plan view showing the PM detection sensor according to the first exemplary embodiment of the present invention.

FIG. 1 is an exploded perspective view showing the PM detection sensor 1 according to the first exemplary embodiment of the present invention. FIG. 2 is a plan view showing the PM detection sensor 1 according to the first exemplary embodiment shown in FIG. 1.

As shown in FIG. 1 and FIG. 2, the PM detection sensor 1 has a sensor body part 2 made of an insulating member. A deposition surface 20 is formed on a first surface of the sensor body part 2. PM 8 is accumulated and deposited on the deposition surface 20 of the sensor body part 2 in the PM detection sensor 1.

Two types of electrodes 3 such as a pair of a positive electrode $3_P$ and a negative electrode $3_N$ are formed on the deposition surface 20 of the sensor body part 2. The positive electrode $3_P$ is composed of a plurality of positive electrode segments $3_{Pseg}$. The negative electrode $3_N$ is composed of a plurality of negative electrode segments $3_{Nseg}$. The pair of the positive electrode $3_P$ and the negative electrode $3_N$ are exposed to exhaust gas g introduced into the inside of the PM detection sensor 1. A direct current voltage (hereinafter, the DC voltage) is supplied between the positive electrode $3_P$ and the negative electrode $3_N$.

That is, the positive electrode $3_P$ is composed of the positive electrode segments $3_{Pseg}$. The negative electrode $3_N$ is composed of the negative electrode segments $3_{Nseg}$. As clearly shown in FIG. 2, the positive electrode segments $3_{Pseg}$ and the negative electrode segments $3_{Nseg}$ are arranged alternately and adjacently to each other at least in a first direction $A_1$ and in a second direction $A_2$ on the deposition surface 20. The first direction $A_1$ and the second direction $A_2$ are orthogonal to a normal direction (Z direction) of the deposition surface 20. For example, as shown in FIG. 2, the first direction $A_1$ corresponds to the short width direction of each of the positive electrode segments $3_{Pseg}$ and the negative electrode segments $3_{Nseg}$. On the other hand, as shown in FIG. 2, the second direction $A_2$ corresponds to an oblique direction viewed from one positive electrode segment $3_{Pseg}$ or one negative electrode segment $3_{Nseg}$.

That is, in one negative electrode segment $3_{Nseg}$ shown in FIG. 2, the two positive electrode segments $3_{Pseg}$ are arranged adjacently at a front location and a rear location in the first direction $A_1$, and other two positive electrode segments $3_{Pseg}$ are also arranged adjacently at oblique locations in an oblique direction, i.e. in the second direction $A_2$.

Similar to the arrangement of the negative electrode segments $3_{Pseg}$ previously described, in one positive electrode segment $3_{Pseg}$, the two negative electrode segments $3_{Nseg}$ are arranged adjacently at a front location and a rear location in the first direction $A_1$, and other two negative electrode segments $3_{Nseg}$ are also arranged adjacently in an oblique direction, i.e. in the second direction $A_2$. That is, as shown in FIG. 2, the positive electrode segments $3_{Pseg}$ and the negative electrode segments $3_{Nseg}$ are alternately arranged on the deposition surface 20 in the X direction and the Y direction.

Figure 7:
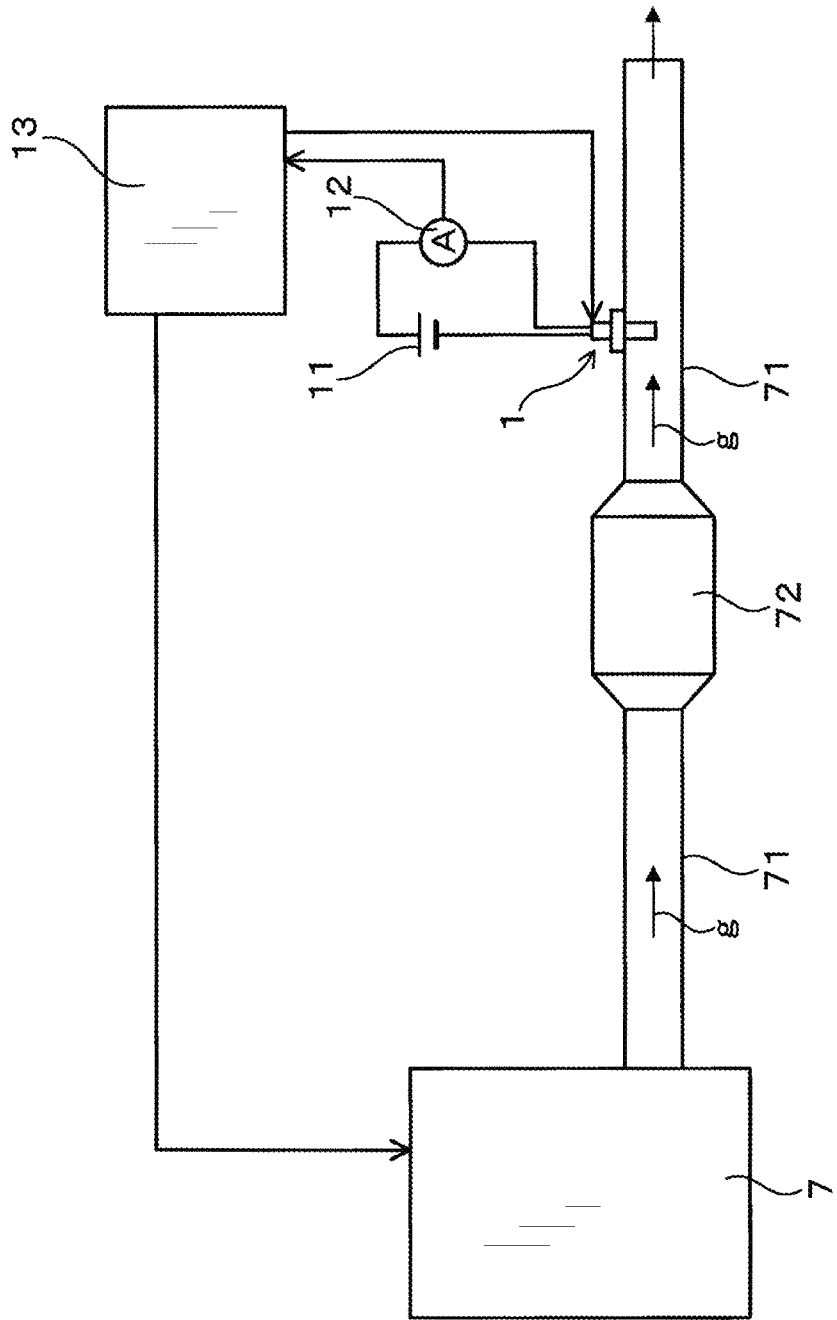
FIG. 7 is a view showing a schematic structure of an exhaust gas system mounted on a motor vehicle in which the PM detection sensor according to the first exemplary embodiment is arranged.

FIG. 7 is a view showing a schematic structure of an exhaust gas system mounted on a motor vehicle in which the PM detection sensor 1 according to the first exemplary embodiment is arranged. As shown in FIG. 7, the engine 7 mounted on the motor vehicle is connected to the exhaust gas pipe 71. The exhaust gas g is emitted from the engine 7, and flows through the exhaust gas pipe 71 to the outside. A particulate matter filter 72 (hereinafter, the PM filter 72) is arranged in the exhaust gas pipe 71. The PM filter 72 collects the PM 8 contained in exhaust gas g. In the exhaust gas system shown in FIG. 7, the PM detection sensor 1 is arranged at a downstream side of the PM filter 72.

The PM detection sensor 1 according to the first exemplary embodiment detects an amount of PM 8 contained in the exhaust gas g which has passed through the PM filter 72. A control part 13 (which will be explained later, such as an electric control unit) determines a failure of the PM filter 72 occurs when the detected amount of the PM 8 is more than a predetermined upper limit value.

The PM detection sensor 1 is connected to a direct current power source 11 (hereinafter, the DC power source 11), a current sensor 12, and the control part 13. The DC power source 11 supplies the DC voltage to the pair of electrode 3 composed of the positive electrode $3_P$ and the negative electrode $3_N$. The current sensor 12 detects a current flowing between the positive electrode $3_P$ and the negative electrode $3_N$.

The control part 13 calculates the amount of PM 8 contained in exhaust gas g on the basis of the detection result of the current sensor 12. A heater part (not shown) is arranged in the PM detection sensor 1 so as to generate heat energy. The control part 13 instructs a power source (not shown) to supply electric power to the heater part. When receiving the electric power, the heater part generates heat energy to burn the PM 8 deposited on the deposition surface 20. The control part 13 adjusts a magnitude of the current flowing in the heater part.

Figure 6:
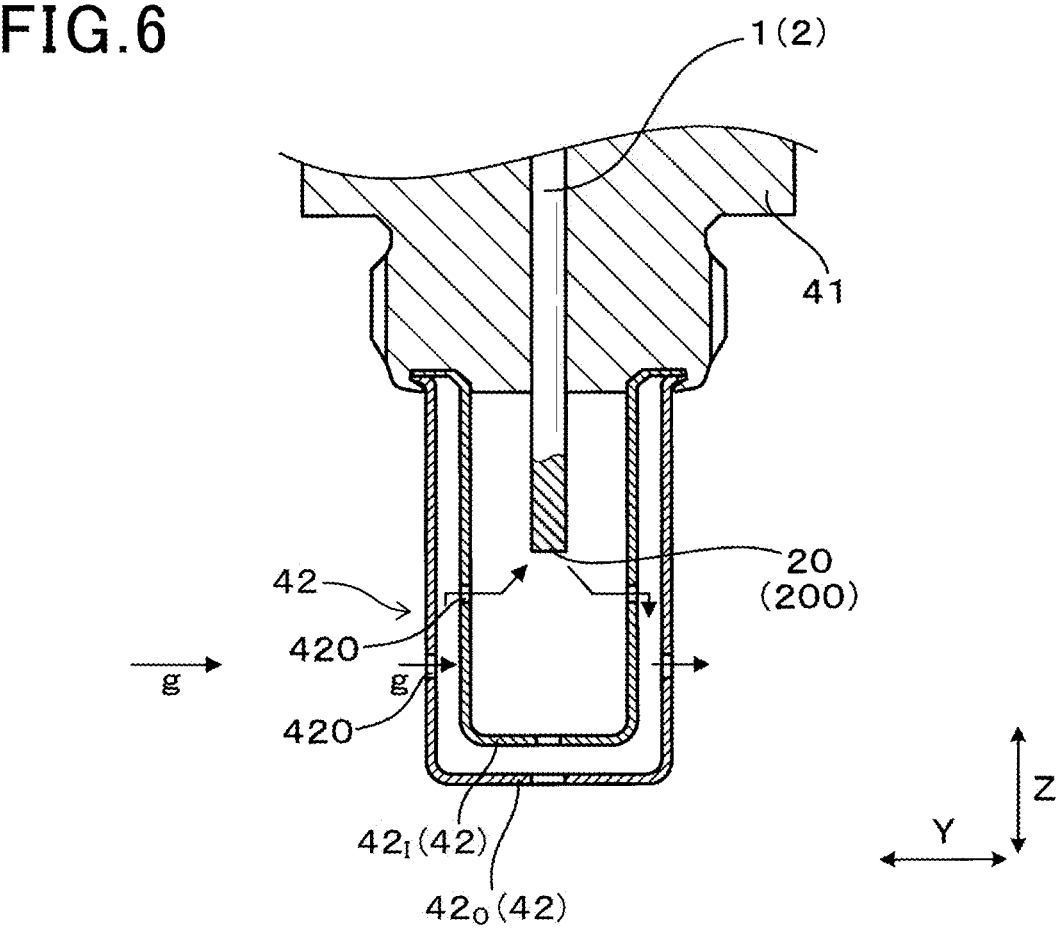
FIG. 6 is a view showing a cross section of the PM detection sensor having a housing casing, an inner cover casing and an outer cover casing according to the first exemplary embodiment.

FIG. 6 is a view showing a cross section of the PM detection sensor 1 according to the first exemplary embodiment having a housing casing 41 and a cover casing 42. The cover casing 42 is composed of an inner cover casing $42_I$ and an outer cover casing $42_O$. As shown in FIG. 6, the PM detection sensor 1 is fixed to the housing casing 41. The deposition surface 20 is formed on a front end surface 200 of the PM detection sensor 1. The inner cover casing $42_I$ and the outer cover casing $42_O$ are fitted to the housing casing 41. Penetration holes 420 are formed in the inner cover casing $42_I$ and the outer cover casing $42_O$ through which exhaust gas is introduced into the inside of the PM detection sensor 1 and discharged to the outside of the PM detection sensor 1. The PM 8 contained in the exhaust gas g which has passed through the penetration holes 420 is accumulated and deposited on the deposition surface 20 of the PM detection sensor 1.

As shown in FIG. 1, the PM detection sensor 1 according to the first exemplary embodiment has a plurality of insulating plates 29 ($29_P$ and $29_N$) made of an insulating member. The plurality of insulating plates $29_P$ and $29_N$ are alternately stacked in the Y direction to form the PM detection sensor 1 shown in FIG. 1. Each of the insulating plates $29_P$ and $29_N$ is made of ceramics such as alumina. A pair of connection terminals 39 are formed in the sensor body part 2. The pair of the positive electrode $3_P$ and the negative electrode $3_N$ are connected to the DC power source 11 (see FIG. 7) through the connection terminals 39.

Lead wirings 38 and the pair of the positive electrode $3_P$ and the negative electrode $3_N$ are formed on the first surface of the sensor body part 2. The pair of the positive electrode $3_P$ and the negative electrode $3_N$ are electrically connected to the connection terminals 39 through the lead wirings 38.

The pair of the positive electrode $3_P$ and the negative electrode $3_N$ have a comp structure. The positive electrode $3_P$ is formed on the insulating plate $29_P$ and the negative electrode $3_N$ is formed on the insulating plate $29_N$. A plurality of the insulating plates $29_P$ and the insulating plates $29_N$ are alternately stacked to form the PM detection sensor 1.

As shown in FIG. 2, each of the positive electrode segments $3_{Pseg}$ and the negative electrode segments $3_{Nseg}$ has a linear shape. The positive electrode segments $3_{Pseg}$ and the negative electrode segments $3_{Nseg}$ are arranged in parallel with each other in the normal direction Z of the deposition surface 20. In the electrode arrangement shown in FIG. 2, the positive electrode segments $3_{Pseg}$ are arranged along a long width direction (i.e. the X direction) of each of the electrodes 3 in the PM detection sensor 1 so as to form a positive electrode group $30_P$. Similar to the positive electrode segments $3_{Pseg}$, the negative electrode segments $3_{Nseg}$ are arranged along the long width direction (i.e. the X direction) so as to form a negative electrode group $30_N$. The positive electrode group $30_P$ and the negative electrode group $30_N$ are alternately arranged in a lateral direction (or a shorter side direction), i.e. in the Y direction.

When a voltage is supplied between the positive electrode $3_P$ and the negative electrode $3_N$ forming the electrode 3, electric field is generated between the positive electrodes $3_P$ and the negative electrodes $3_N$. In particular, an electric field having a high intensity is generated in an area close to the positive electrode segments $3_{Pseg}$ and the negative electrode segments $3_{Nseg}$ formed on the deposition surface 20.

Figure 3:
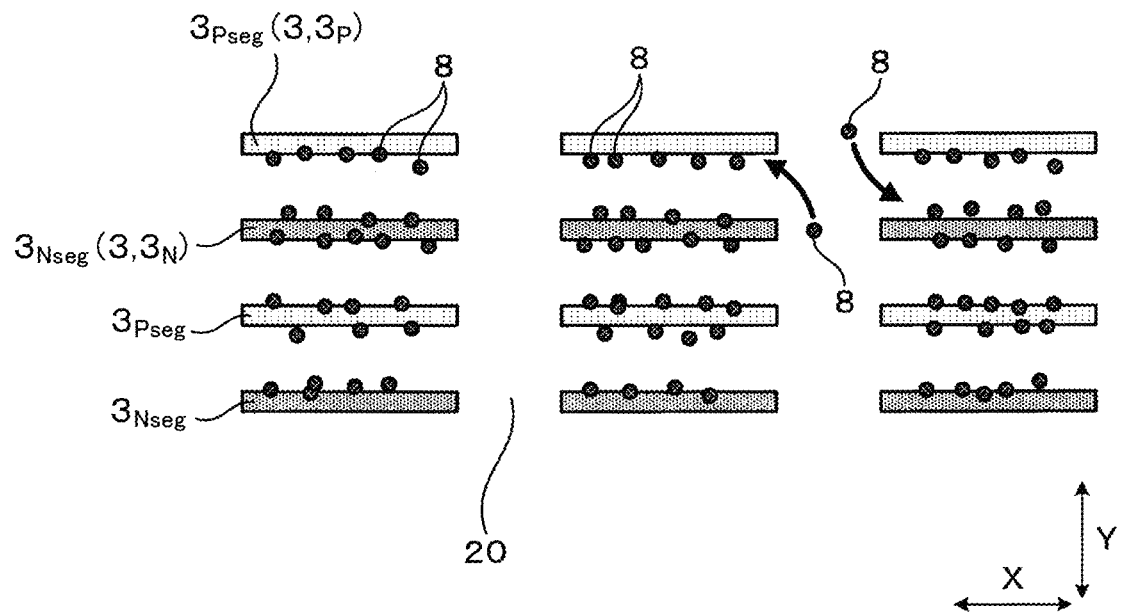
FIG. 3 is a partial enlarged view of the PM detection sensor according to the first exemplary embodiment shown in FIG. 2, in which PM is attracted and collected, but no PM bridge part is formed.

FIG. 3 is a partial enlarged view of the PM detection sensor 1 according to the first exemplary embodiment shown in FIG. 2, in which the PM 8 is attracted and collected. Because the PM 8 is slightly charged, the PM 8 contained in the exhaust gas g is attracted, accumulated and deposited between the positive electrode segments $3_{Pseg}$ and the negative electrode segments $3_{Nseg}$ by electrostatic force.

Figure 4:
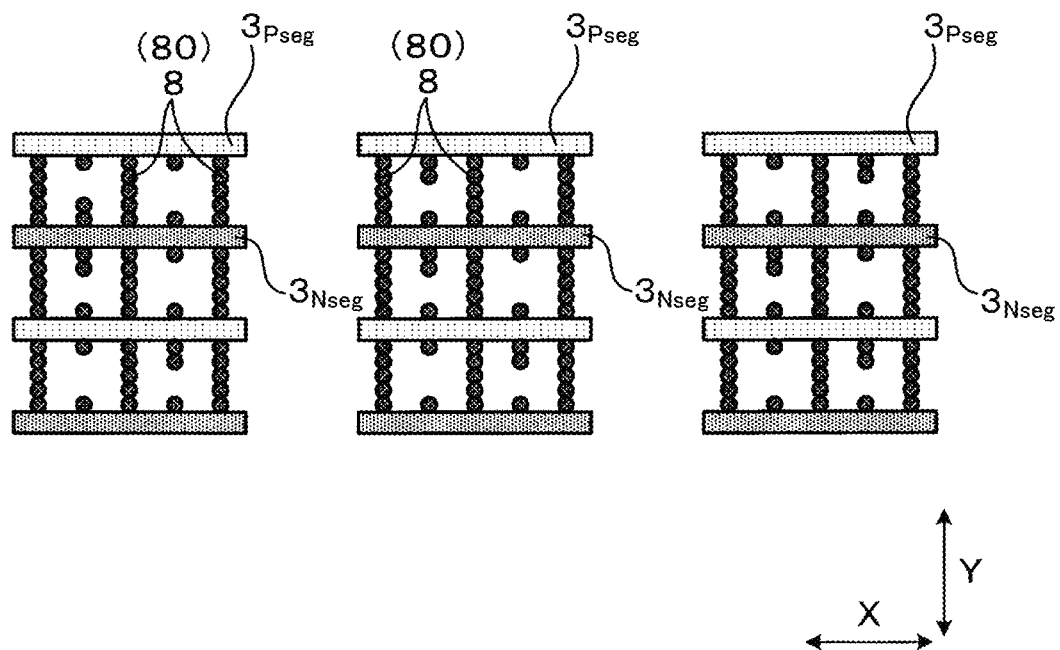
FIG. 4 is a partial enlarged view of the PM detection sensor according to the first exemplary embodiment shown in FIG. 2, in which PM bridge parts composed of bonded PM are formed.

FIG. 4 is a partial enlarged view of the PM detection sensor 1 according to the first exemplary embodiment shown in FIG. 2, in which a plurality of PM bridge parts 80 composed of bonded PM are formed. When the PM bridge parts 80 are formed as shown in FIG. 4, a current flows between the positive electrode segment $3_{Pseg}$ and the negative electrode segments $3_{Nseg}$ forming the positive electrode $3_P$ and the negative electrode $3_N$. Increasing of the number of the PM bridges 80 increases the amount of the current.

Figure 5:
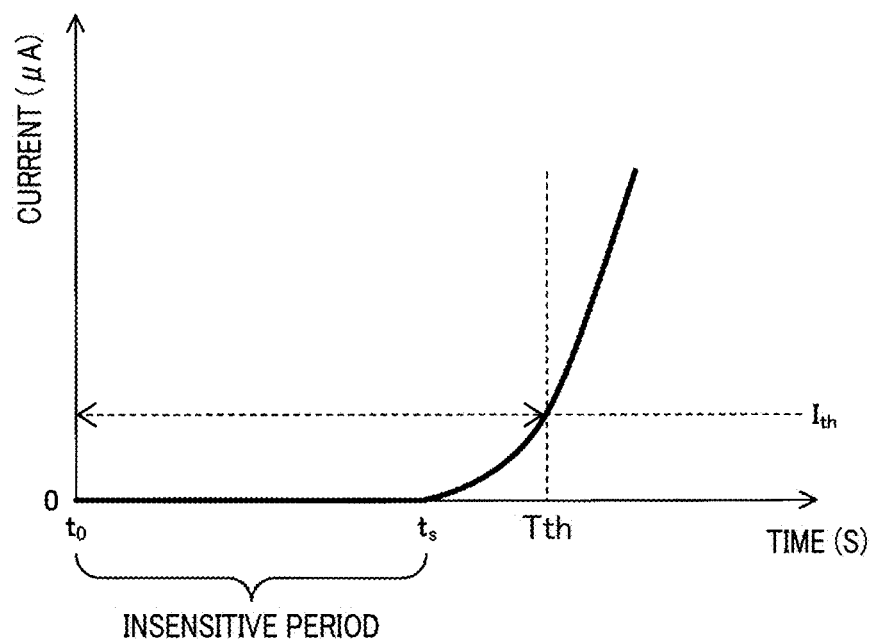
FIG. 5 is a graph showing a time variation of a current flowing between electrodes formed in the PM detection sensor according to the first exemplary embodiment.

FIG. 5 is a graph showing a time variation of the current flowing between the positive electrode segments $3_{Pseg}$ and the negative electrode segments $3_{Nseg}$ forming the pair of the positive electrode and the negative electrode in the PM detection sensor 1 according to the first exemplary embodiment. As shown in FIG. 5, no current flows between the pair of electrodes during a short time period (as an insensitive period shown in FIG. 5) counted from a detection start timing $t_0$ to a current-flow start timing $t_s$ because any PM bridge part 80 is not still formed between the positive electrode segments $3_{Pseg}$ and the negative electrode segments $3_{Nseg}$.

As previously described, the insensitive period is counted from the detection start timing $t_O$ to the current-flow start timing $t_s$ shown in FIG. 5. At the current-flow start timing $t_s$, the PM detection sensor 1 detects an amount of PM 8 for the first time contained in the exhaust gas g. That is, when the PM bridge parts 80 are formed at the current-flow start timing ts, a current starts to flow between the positive electrode segments $3_{Pseg}$ and the negative electrode segments $3_{Nseg}$ in the pair of the positive electrode $3_P$ and the negative electrode $3_N$.

The PM detection sensor 1 according to the first exemplary embodiment detects a period T (see FIG. 5) counted from the detection start timing $t_0$ to a threshold timing $T_{th}$ when the current reaches a current threshold value $I_{th}$.

The PM detection sensor 1 according to the first exemplary embodiment detects the amount of PM 8 contained in the exhaust gas g on the basis of the detected period T.

A description will now be given of the effects of the PM detection sensor 1 according to the first exemplary embodiment. As shown in FIG. 2, in the improved electrode arrangement in the PM detection sensor 1 according to the first exemplary embodiment, the positive electrode segments $3_{Pseg}$ and the negative electrode segments $3_{Nseg}$ are alternately arranged, on the deposition surface 20 formed on the sensor body part 2, adjacently to each other in at least two specific directions, i.e. in the first direction $A_1$ and the second direction $A_2$ (see FIG. 2) which are orthogonal to the Z direction.

This improved electrode arrangement makes it possible to enhance the PM detection sensitivity of the PM detection sensor 1 for detecting the amount of PM 8 contained in the exhaust gas g. In other words, this improved electrode arrangement generates an electric field having a relatively high intensity at the parts close to the positive electrode segments $3_{Pseg}$ and the negative electrode segments and generates an electric field having a relatively low intensity at the remaining parts which are not close to the positive electrode segments $3_{Pseg}$ and the negative electrode segments $3_{Nseg}$. The improved electrode arrangement in the PM detection sensor 1 according to the first exemplary embodiment makes it possible to form the parts having a high electric field intensity and the parts having a low electric field intensity on the deposition surface 20 of the sensor body part 2. Accordingly, as shown in FIG. 4, PM 8 is easily deposited and PM bridge parts 80 are easily formed on the parts having a high electric field intensity on the deposition surface 20 of the sensor body part 2. The generation speed of the PM bridge parts 80 is high on the parts having a high electric field intensity. This improved electrode arrangement allows the current to easily flow within a short time between the positive electrode segments $3_{Pseg}$ and the negative electrode segments $3_{Nseg}$, and enhances the PM detection sensitivity of the PM detection sensor 1.

Figure 23:
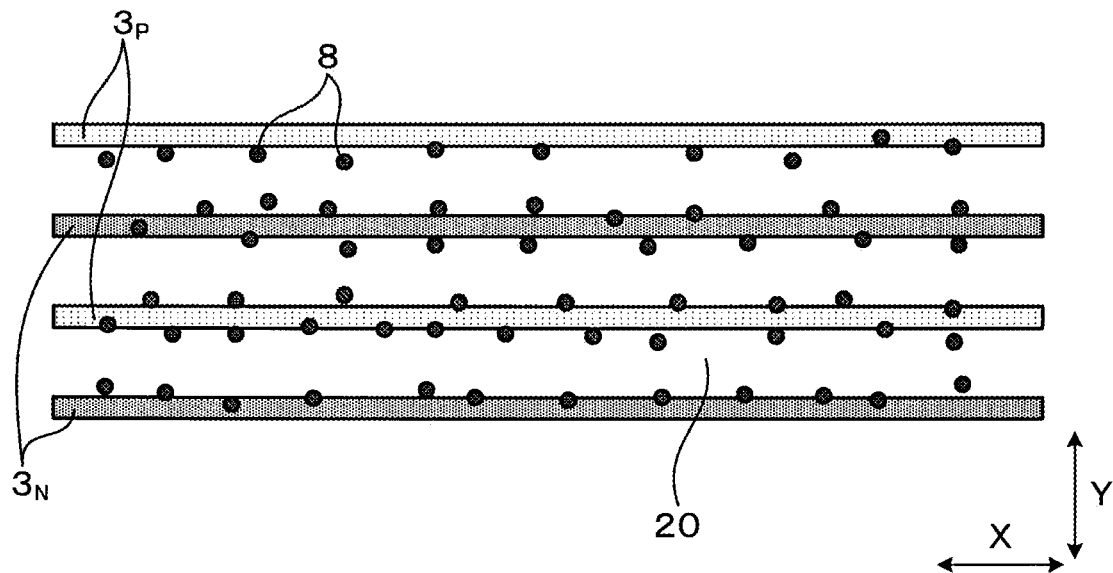
FIG. 23 is a partial enlarged view of a PM detection sensor according to a comparative example, in which particulate matter is deposited.

By the way, in a conventional electrode structure shown in FIG. 23, when each of the positive electrode $3_P$ and the negative electrode $3_N$ has a small width and a long length arranged on the overall deposition surface 20, a uniform-intensity electric field is generated on the overall deposition surface 20. In this case, PM 8 are uniformly deposited on the deposition surface 20 and a growth rate of the PM bridge parts 80 become low.

On the other hand, in the improved electrode arrangement of the PM detection sensor 1 according to the first exemplary embodiment, as shown in FIG. 2, each of the positive electrode segments $3_{Pseg}$ and the negative electrode segments $3_{Nseg}$ has a short width and a short length and a plurality number of the positive electrode segments $3_{Pseg}$ and the negative electrode segments $3_{Nseg}$ are distributed and arranged on the overall deposition surface 20 of the sensor body part 2. In this improved electrode arrangement, the parts having a high electric field intensity and the parts having a high electric field intensity are alternately generated, and the PM bridge parts 80 composed of bonded PM 8 are formed on the parts having a high electric field intensity. Accordingly, the growth rate of the PM bridge parts 80 becomes high and a current quickly flows between the positive electrode segments $3_{Pseg}$ and the negative electrode segments $3_{Nseg}$ within a short period of time. That is, this improved electrode arrangement makes it possible to reduce the insensitive period which is counted from the detection start timing $t_0$ to the current-flow start timing is shown in FIG. 5, and to enhance the detection sensitivity of the PM detection sensor 1 for detecting an amount of PM 8 contained in exhaust gas g.

In the improved structure of the PM detection sensor 1 according to the first exemplary embodiment, because the high-intensity electric field part is generated on each of the specific parts on the deposition surface 20, this makes it possible to attract PM 8 strongly and to quickly grow the PM bridge parts 80 regardless of the relationship between the flow direction of the exhaust gas g and the direction of the generated electric fields on the deposition surface 20 of the sensor body part 2. This structure makes it possible to reduce the influence of variation of the flow direction of the exhaust gas g to the PM detection sensitivity of the PM detection sensor 1.

Figure 24:
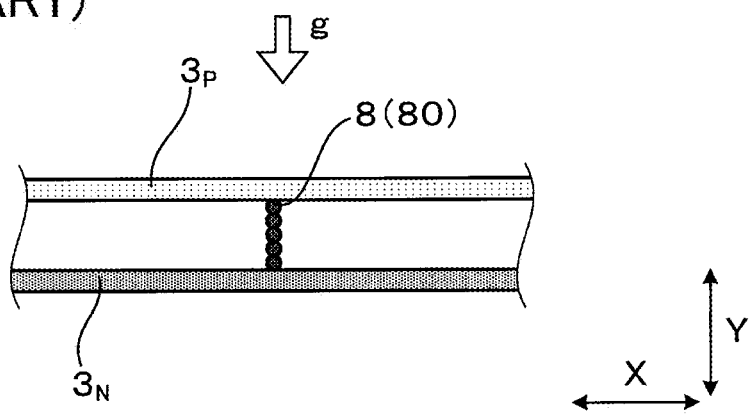
FIG. 24 is a view showing a PM bridge part formed between electrodes in the PM detection sensor according to the comparative example when exhaust gas flows in a Y direction.

FIG. 24 is a view showing the PM bridge part 80 composed of bonded PM 8 formed between the positive electrode $3_P$ and the negative electrode $3_N$ in the PM detection sensor according to the comparative example when exhaust gas g flows in the Y direction. On the other hand, FIG. 25 is a view showing bonded PM, but no PM bridge part is formed between the positive electrode $3_P$ and the negative electrode $3_N$ in the PM detection sensor according to the comparative example when the exhaust gas g flows in the X direction which is perpendicular to the Y direction.

Figure 25:
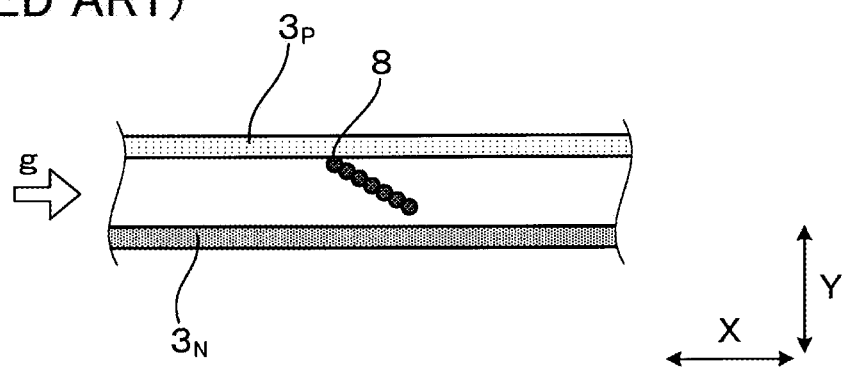
FIG. 25 is a view showing bonded PM which does not form a PM bridge part between electrode segments in the PM detection sensor according to the comparative example when exhaust gas flows in a X direction.

As shown in FIG. 24 and FIG. 25, a uniform-intensity electric field is generated on the overall deposition surface when each of the between the positive electrode $3_P$ and the negative electrode $3_N$ is formed to have a small width and a long length extending along the overall deposition surface, i.e. no electrode segments are formed and arranged dispersedly on the overall deposition surface. This conventional structure prevents generation of a strong attraction force for attracting PM 8 onto the deposition surface. As shown in FIG. 24, when the flow direction of the exhaust gas g coincides with the direction of the generated electric field, the PM bridge part 80 is formed along the direction of the generated electric field. This case allows a current to flow between the positive electrode $3_P$ and the negative electrode $3_N$.

On the other hand, in the case shown in FIG. 25 in which the exhaust gas g flows in the X direction which is perpendicular to the Y direction, it becomes difficult to generate the PM bridge part 80 in the direction of the generated electric field, and as a result to prevent the current from rapidly flowing within a short period of time. Accordingly, the PM detection sensor according to the comparative example has different detection sensitivity due to variation of the flow direction of the exhaust gas g.

On the other hand, as shown in FIG. 4, the improved structure of the PM detection sensor 1 according to the first exemplary embodiment easily generates a plurality of parts having a high-intensity electric field on the deposition surface 20, and allows PM 8 to be mutually attracted by the strong attraction force on the deposition surface 20. This improved structure of the PM detection sensor 1 provides excellent and stable detection sensitivity to detect presence of PM 8 contained in exhaust gas g regardless of the flow direction of the exhaust gas and allows the PM bridge part 80 to be generated within a short period of time.

In the improved electrode arrangement in the PM detection sensor 1 according to the first exemplary embodiment shown in FIG. 2, each of the plurality of the positive electrode segments $3_{Pseg}$ and the negative electrode segments $3_{Nseg}$ has a linear shape in the Z direction as the normal direction of the deposition surface 20, and the positive electrode segments $3_{Pseg}$ and the negative electrode segments $3_{Nseg}$ are arranged parallel with each other. Because the positive electrode segments $3_{Pseg}$ and the negative electrode segments $3_{Nseg}$ have a simple shape and are arranged at constant intervals, it is possible to easily produce the PM detection sensor 1.

In the improved electrode arrangement in the PM detection sensor 1 according to the first exemplary embodiment shown in FIG. 2, the plurality of the positive electrode segments $3_{Pseg}$ and the negative electrode segments $3_{Nseg}$ are arranged adjacently to each other in the X direction to form the electrode groups 30. That is, the electrode groups 30 are composed of the positive electrode groups $30_P$ and the negative electrode groups $30_N$. The electrode segments are grouped into the positive electrode groups $30_P$ and the negative electrode groups $30_N$. The positive electrode groups $30_P$ and the negative electrode groups $30_N$ are alternately arranged adjacently to each other in the Y direction.

This structure makes it possible to obtain a regular arrangement, and allows the PM detection sensor 1 to be easily produced.

In the improved structure of the PM detection sensor 1 according to the first exemplary embodiment shown in FIG. 2, the positive electrode segments $3_{Pseg}$ are arranged adjacently to each other in the X direction so as to form the positive electrode groups $30_P$, and the negative electrode segments $3_{Nseg}$ are arranged adjacently to each other in the X direction so as to form the negative electrode groups $30_N$. That is, the positive electrode groups $30_P$ and the negative electrode groups $30_N$ are alternately arranged in the Y direction. This improved structure makes it possible to arrange the same kind of the electrodes, i.e. the positive electrode segments $3_{Pseg}$ and the negative electrode segments $3_{Nseg}$, respectively, in the X direction. This makes it possible to increase the total number of the electrode segments $3_{Pseg}$ and $3_{Nseg}$ capable of facing each other in the X direction and the Y direction and to enhance the efficiency of collecting PM 8.

As previously described in detail, the first exemplary embodiment provides the PM detection sensor 1 having an excellent detection sensitivity for correctly and rapidly detecting an amount of PM contained in exhaust gas regardless of variation of the flow direction of exhaust gas.

Second Exemplary Embodiment

A description will be given of the PM detection sensor 1 according to the second exemplary embodiment with reference to FIG. 8 to FIG. 12.

Figure 8:
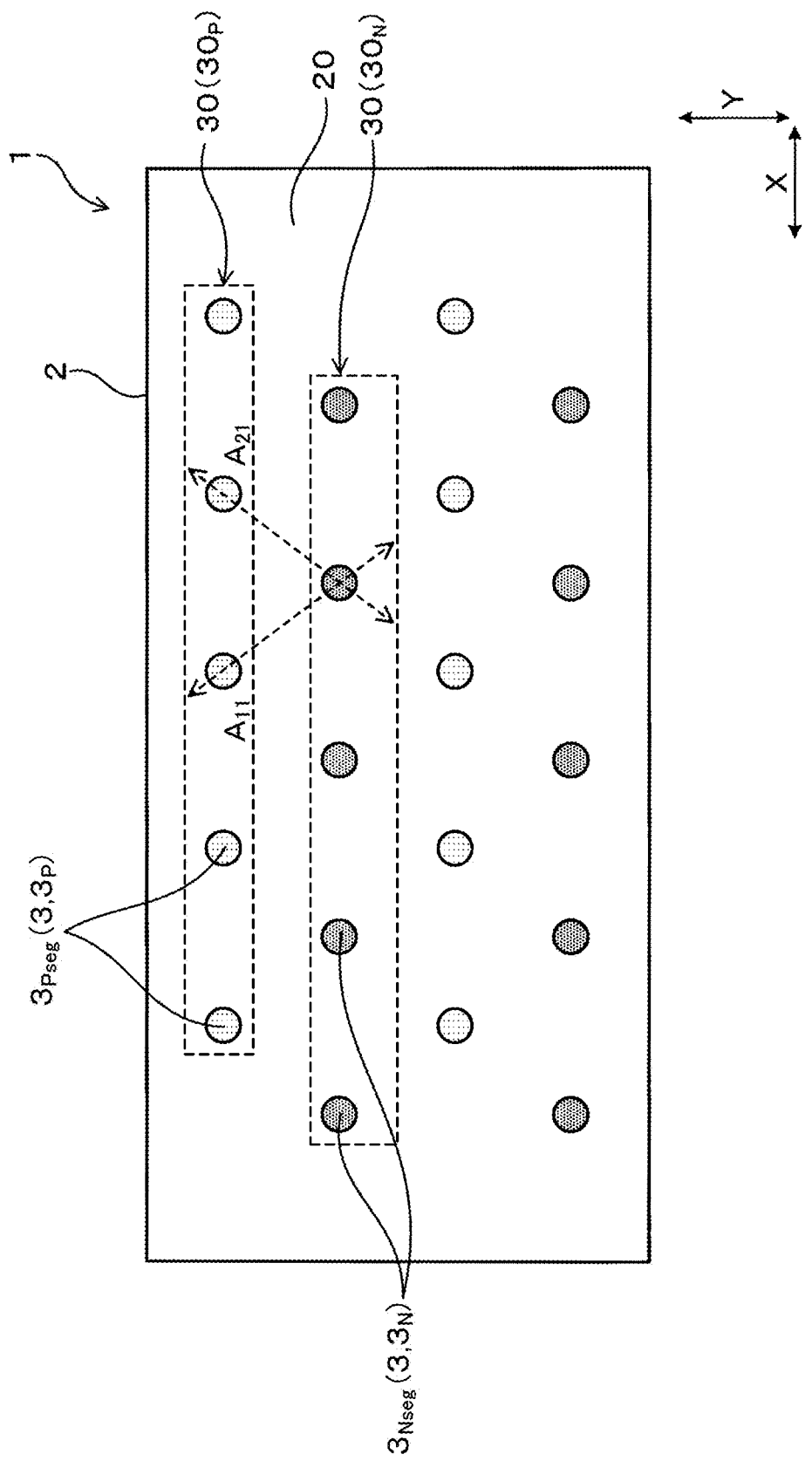
FIG. 8 is a plan view showing the PM detection sensor according to a second exemplary embodiment of the present invention.

FIG. 8 is a plan view showing the PM detection sensor 1 according to the second exemplary embodiment of the present invention. As shown in FIG. 8, each of the electrodes 3 formed on the deposition surface 20 in the PM detection sensor 1 according to the second exemplary embodiment has a circular shape which is difference from the shape of each of the electrodes 3 formed in the PM detection sensor 1 according to the first exemplary embodiment. The different components of the PM detection sensor 1 between the second exemplary embodiment and the first exemplary embodiment will be referred with the same reference numbers and characters. The explanation of the same components is omitted here for brevity.

In the PM detection sensor 1 according to the second exemplary embodiment shown in FIG. 8, each electrode segment $3_{Pseg}$, $3_{Nseg}$ has a circular shape in the Z direction. Similar to the electrode arrangement in the PM detection sensor 1 according to the first exemplary embodiment, in the PM detection sensor 1 according to the second exemplary embodiment, the positive electrode segments $3_{Pseg}$ and the negative electrode segments $3_{Nseg}$ are alternately arranged adjacently to each other in at least two oblique directions $A_{11}$ and $A_{21}$.

In the electrode arrangement according to the second exemplary embodiment shown in FIG. 2, the positive electrode segments $3_{Pseg}$ are arranged to form the positive electrode groups $30_P$. Similarly, the negative electrode segments $3_{Nseg}$ are arranged to form the negative electrode groups $30_N$.

As shown in FIG. 8, the positive electrode groups $30_P$ and the negative electrode groups $30_N$ are alternately arranged in the Y direction which is perpendicular to the X direction and the Z direction.

Figure 9:
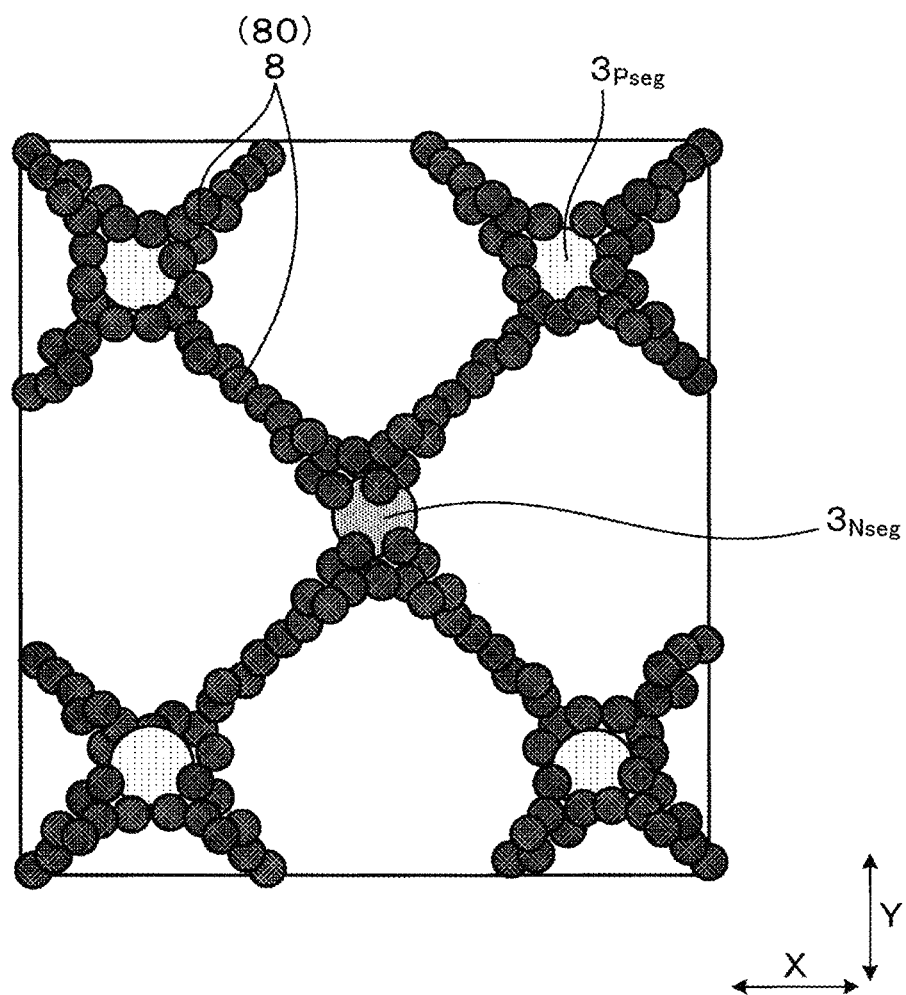
FIG. 9 is a partial enlarged view of the PM detection sensor according to the second exemplary embodiment, in which PM is deposited and PM bridge parts composed of bonded PM are formed.

FIG. 9 is a partial enlarged view of the PM detection sensor 1 according to the second exemplary embodiment, in which PM is deposited and PM bridge parts 80 composed of bonded PM 8 are formed. As shown in FIG. 9, the generated electric field has the maximum intensity and PM bridge parts 80 are easily formed on straight lines through which the positive electrode segments $3_{Pseg}$ and the negative electrode segments $3_{Nseg}$ are connected together. Because each electrode segment has a circular shape, i.e. a high symmetry shape, this structure makes it possible to suppress the detection sensitivity of detecting PM 8 from being reduced caused by variation of the direction of exhaust gas g when compared with the case of the first exemplary embodiment.

A description will now be given of simulation results and effects obtained by the structure of the electrodes in the PM detection sensor 1 according to the second exemplary embodiment with reference to FIG. 10 and FIG. 11.

Figure 10:
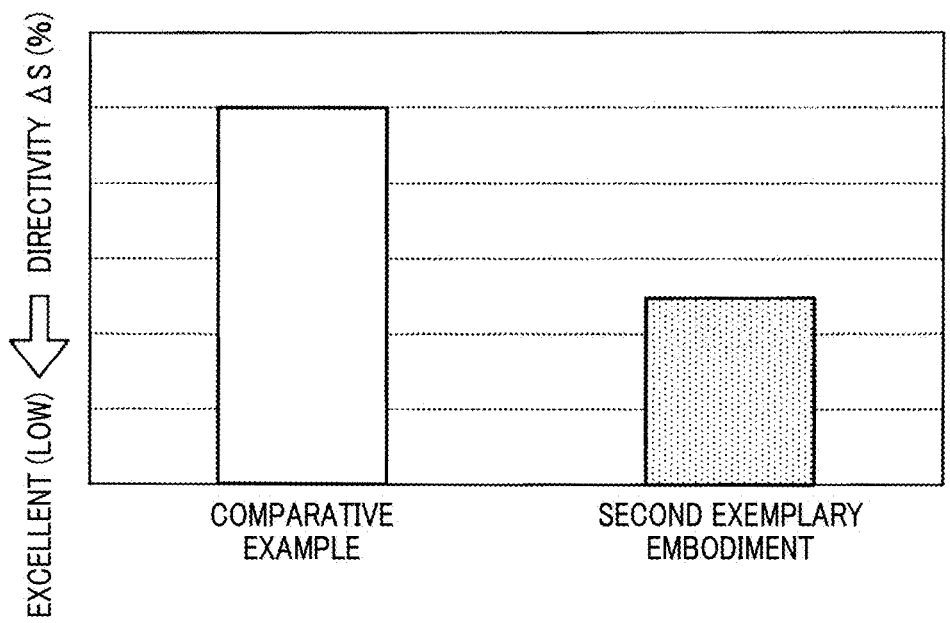
FIG. 10 is a graph showing a directivity in PM detection sensitivity of the PM detection sensor and a comparative example.

FIG. 10 is a graph showing a directivity of PM detection sensitivity of the PM detection sensor and the comparative example. FIG. 11 is a view showing a cross section of the PM detection sensor 1 according to the second exemplary embodiment to be used in the graph shown in FIG. 10. FIG. 12 is a view showing a cross section of the PM detection sensor 1 which is turned by 90 degrees relative to the flow direction of exhaust gas g when compared with the PM detection sensor shown in FIG. 11.

Figure 11:
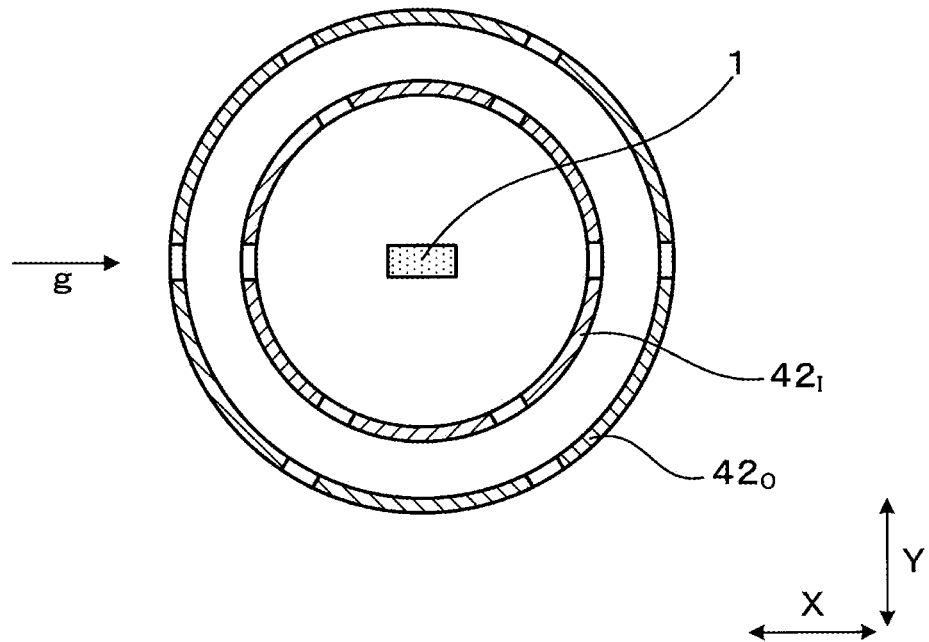
FIG. 11 is a view showing a cross section of the PM detection sensor according to the second exemplary embodiment to be used in the graph shown in FIG. 10.
Figure 12:
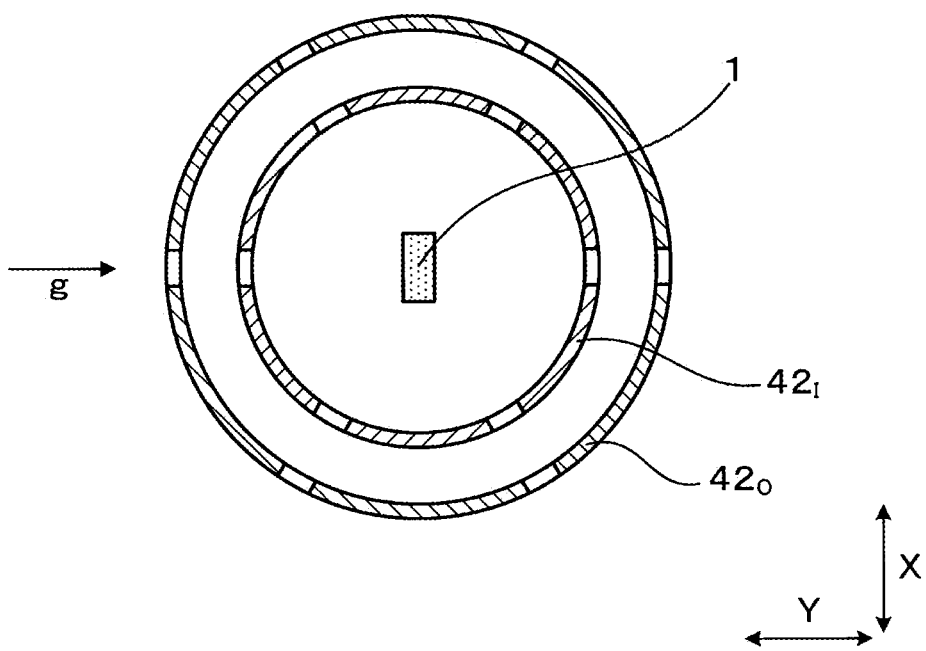
FIG. 12 is a view showing a cross section of the PM detection sensor which is turned by 90 degrees relative to the flow direction of exhaust gas when compared with the PM detection sensor shown in FIG. 11.

As shown in FIG. 11 and FIG. 12, simulations were performed in which the flow direction of exhaust gas g was fixed and the arrangement direction of the cover casing 42 composed of the inner cover casing 421 and the outer cover casing $42_O$. (see FIG. 11, FIG. 12 and FIG. 6). In the simulation cases, the orientation of the PM detection sensor 1 shown in FIG. 12 is turned by 90 degree relative to the direction of the PM detection sensor 1 shown in FIG. 11.

In the simulation case shown in FIG. 11, the electrode groups 30 are arranged in the X direction which coincides with the flow direction of the exhaust gas g.

On the other hand, in the simulation case shown in FIG. 12, the electrode groups 30 are arranged in the X direction which is orthogonal to the flow direction of the exhaust gas g.

In the simulation, a threshold period T at which a current, i.e. an electrical conductive current flowing between the positive electrode segments $3_{Pseg}$ and the negative electrode segments $3_{Nseg}$ reached the current threshold value $I_{th}$ (see FIG. 5) was detected, wherein exhaust gas g contained PM 8 of a concentration of 3.0 mg/mm$^3$, and the exhaust gas g had a flow speed of 10 m/s.

The threshold period $T_1$ of the simulation case shown in FIG. 11 and the threshold period $T_2$ of the simulation case shown in FIG. 12 were calculated. Further, the directivity ΔS in the detection sensitivity of the PM detection sensor to the flow direction of the exhaust gas g was calculated by using the following equation.

$$\Delta S = (T_2 - T_1) / \{(T_2 - T_1)/2\} \times 100.$$

The reduction of the directivity ΔS of detection sensitivity of the PM detection sensor to the flow direction of exhaust gas corresponds to the reduction of the influence of variation in detection sensitivity due to variation in flow direction of exhaust gas. That is, when the flow direction of exhaust gas varies and the threshold period T does not change, the value $(T_2-T_1)$ is reduced, and as a result, the directivity ΔS in the detection sensitivity of the PM detection sensor becomes a small value. When the flow direction of exhaust gas changes and the threshold period T significantly changes, the value $(T_2-T_1)$ increases, and as a result, the directivity ΔS in the detection sensitivity of the PM detection sensor becomes a large value.

The directivity ΔS in the detection sensitivity of the PM detection sensor having the conventional structure (see FIG. 23), in which the electrodes 3 were continuously formed along the overall deposition surface of the sensor body part, was detected. FIG. 10 shows the detection results of the second exemplary embodiment and the comparative example. As shown in FIG. 10, the comparative example has the directivity ΔS of 10.0%, and the second exemplary embodiment has the directivity ΔS of 5.0%. The improved electrode arrangement in the PM detection sensor shown in FIG. 2, in which the positive electrode segments $3_{Pseg}$ and the negative electrode segments $3_{Nseg}$ have a circular shape, respectively and are arranged dispersedly, makes it possible to suppress variation in detection sensitivity of the PM detection sensor caused by variation in flow direction of exhaust gas. In addition, the PM detection sensor according to the second exemplary embodiment has the same behavior and effects as the PM detection sensor according to the first exemplary embodiment.

Third Exemplary Embodiment

A description will be given of the PM detection sensor according to the third exemplary embodiment with reference to FIG. 13. The PM detection sensor according to the third exemplary embodiment has a structure which is different from the structure of the PM detection sensor according to the first and second exemplary embodiments.

Figure 13:
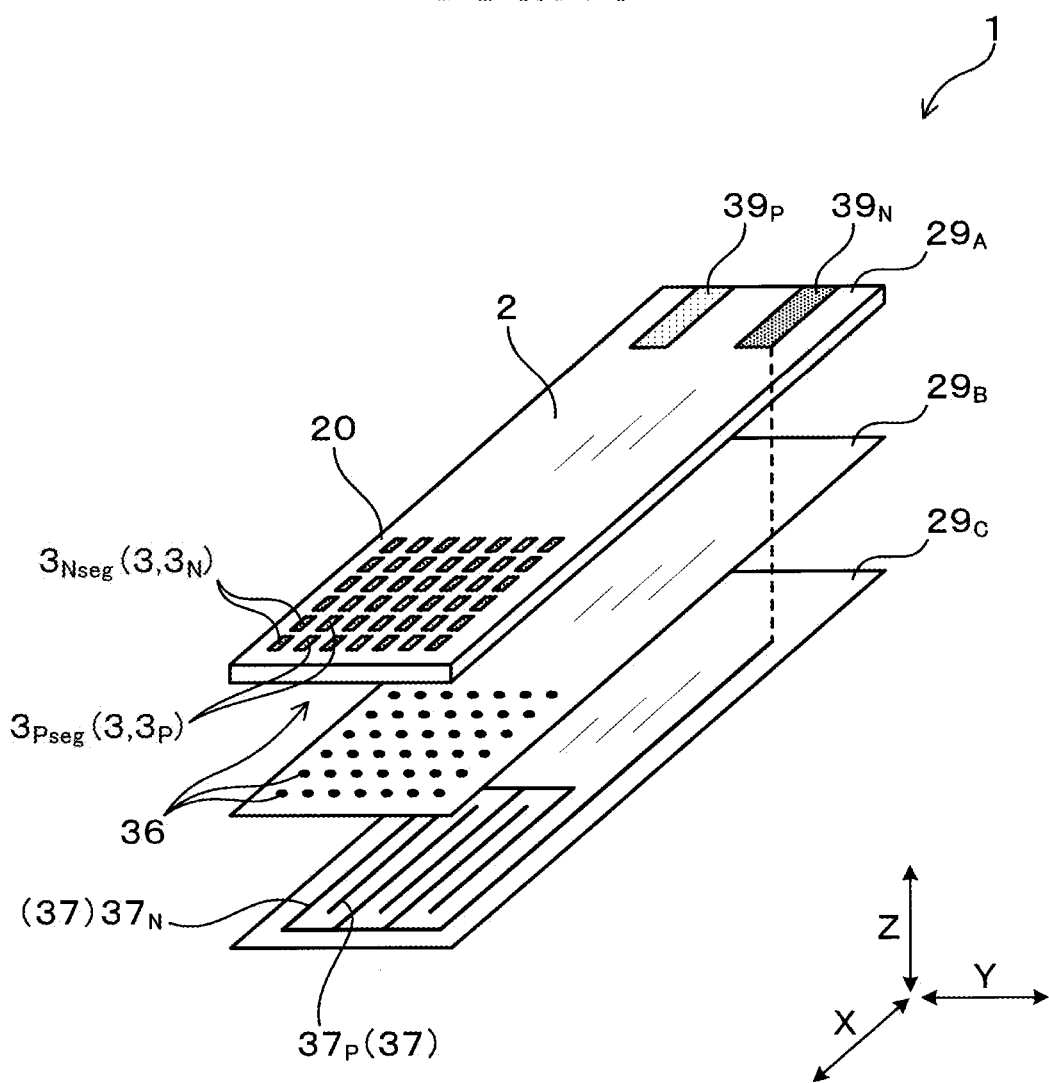
FIG. 13 is an exploded perspective view showing the PM detection sensor according to a third exemplary embodiment of the present invention.

FIG. 13 is an exploded perspective view showing the PM detection sensor 1 according to the third exemplary embodiment of the present invention. As shown in FIG. 13, the PM detection sensor 1 according to the third exemplary embodiment has the three insulating plates 29 composed of a first insulating plate 29A, a second insulating plate 29B and a third insulating plate $29_C$.

The positive electrodes $3_P$, the negative electrodes $3_N$, connection, a connection terminal $39_P$ and a connection terminal $29_N$ are formed on the first insulating plate 29A. Through-holes 36 are formed in the first insulating plate 29A and the second insulating plate 29B. Conductive parts $37_P$ and $37_N$ having a comb structure are formed on the third insulating plate $29_C$. The positive electrode segments $3_{Pseg}$ and the negative electrode segments $3_{Nseg}$ are electrically connected to the conductive parts $37_P$ and $37_N$ having a comb structure, respectively. The PM detection sensor according to the third exemplary embodiment has the same behavior and effects as the PM detection sensor according to the first exemplary embodiment.

Fourth Exemplary Embodiment

A description will be given of the PM detection sensor 1 according to the fourth exemplary embodiment with reference to FIG. 14, FIG. 15, FIG. 16 and FIG. 17. The PM detection sensor according to the fourth exemplary embodiment has a structure which is different from the structure of the PM detection sensor according to the first, second and third exemplary embodiments.

Figure 14:
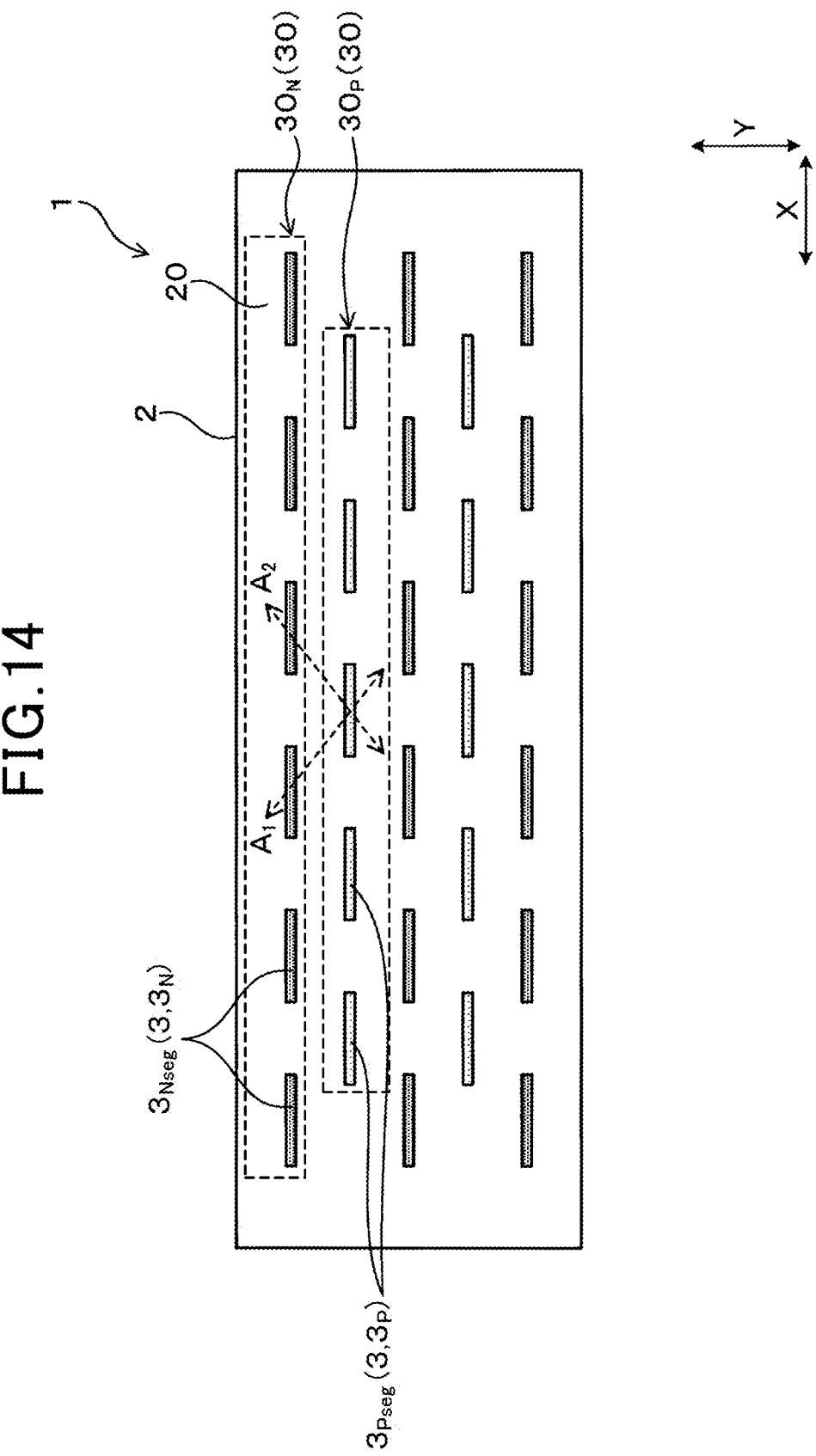
FIG. 14 is a plan view showing the PM detection sensor according to a fourth exemplary embodiment of the present invention.
Figure 15:
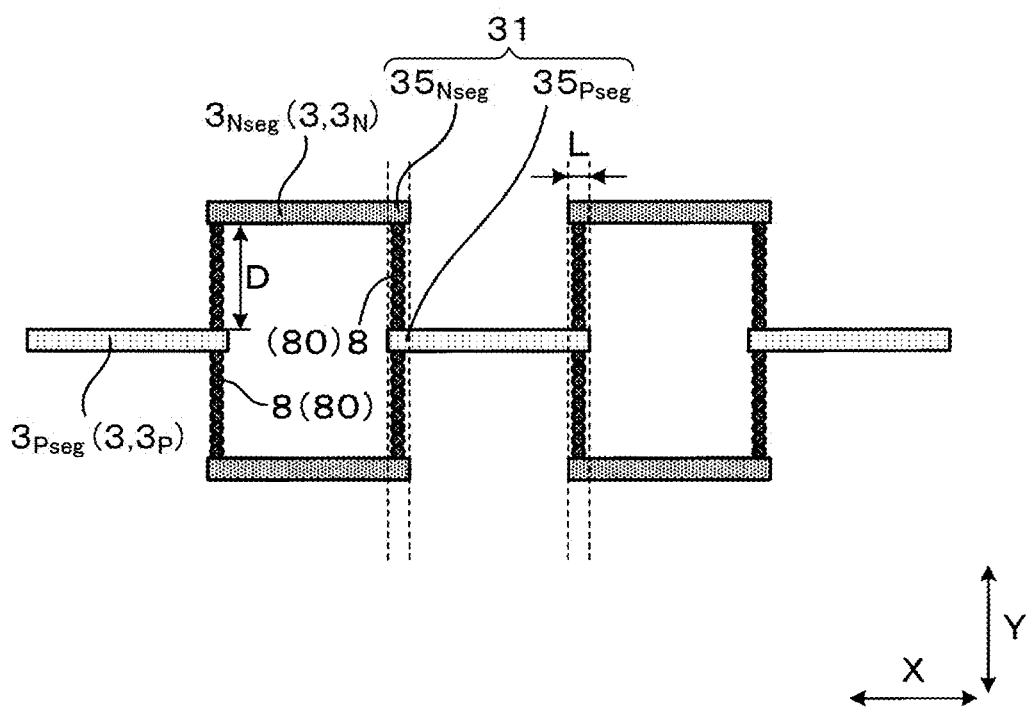
FIG. 15 is a partial enlarged view of the PM detection sensor according to the fourth exemplary embodiment shown in FIG. 14, in which particulate matter is deposited and PM bridge parts composed of bonded PM are formed.

FIG. 14 is a plan view showing the PM detection sensor 1 according to the fourth exemplary embodiment of the present invention. FIG. 15 is a partial enlarged view of the PM detection sensor 1 according to the fourth exemplary embodiment shown in FIG. 14. As shown in FIG. 14 and FIG. 15, similar to the structure of the PM detection sensor according to the first exemplary embodiment, the PM detection sensor according to the fourth exemplary embodiment has a structure in which the positive electrode segments $3_{Pseg}$ and the negative electrode segments $3_{Nseg}$ are arranged dispersedly on the overall deposition surface 20. Each of the positive electrode segments $3_{Pseg}$ and the negative electrode segments $3_{Nseg}$ in the electrodes 3 is formed to have a linear shape. The positive electrode segments $3_{Pseg}$ are arranged in the X direction to form the positive electrode groups $30_P$, and the negative electrode segments $3_{Nseg}$ are arranged in the X direction to form the negative electrode groups $30_N$.

In the structure of the PM detection sensor according to the fourth exemplary embodiment, the positive electrode groups $30_P$ and the negative electrodes $3_N$ are alternately arranged in the Y direction on the deposition surface 20.

In the structure of the PM detection sensor according to the fourth exemplary embodiment, in the Y direction, a part of the negative electrode segment $3_{Nseg}$ is arranged between the two positive electrode segments $3_{Pseg}$ which are arranged adjacently to each other in the X direction. Similarly, in the Y direction, a part of the positive electrode segment $3_{Pseg}$ is arranged between the two negative electrode segments $3_{Nseg}$ which are adjacently to each other in the X direction. As shown in FIG. 15, in the Y direction, the end part $35_P$ of the positive electrode segment $3_{Pseg}$ in the X direction faces the end part $35_N$ of the negative electrode segment $3_{Nseg}$ in the X direction.

Figure 16:
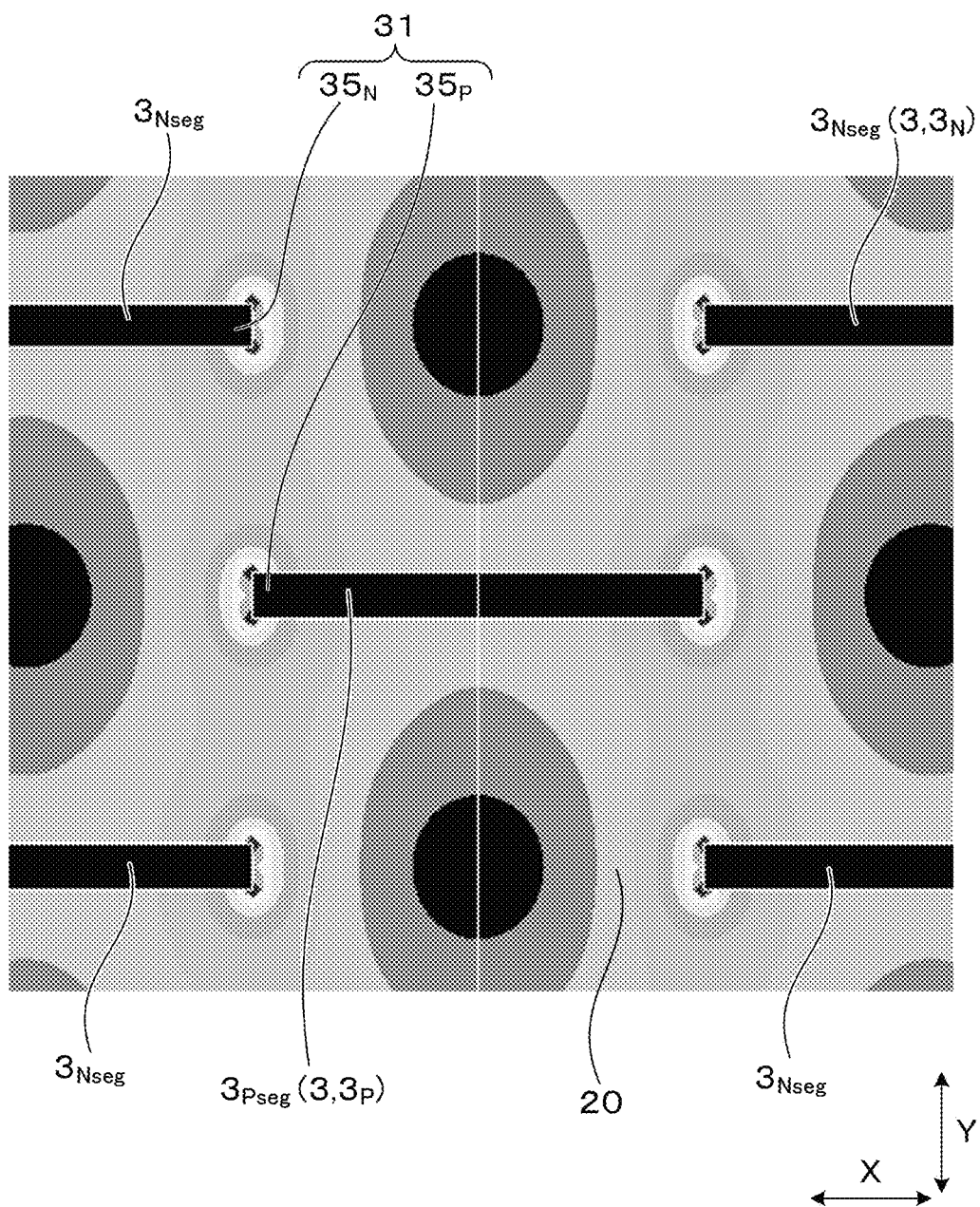
FIG. 16 is a view showing an intensity distribution of electric fields generated on the deposition surface in the PM detection sensor having another structure according to the fourth exemplary embodiment.

FIG. 16 is a view showing an intensity distribution of the electric fields generated on the deposition surface 20 in the PM detection sensor 1 having another structure according to the fourth exemplary embodiment.

As shown in FIG. 16, the electric field having a high intensity is generated on a part between the two negative electrode segments $3_{Nseg}$ arranged adjacently to each other in the X direction. Similarly, the electric field having a high intensity is also generated on a part between the two positive electrode segments $3_{Pseg}$ arranged adjacently to each other in the X direction. On the other hand, the electric field having a low intensity is generated on a facing part 31 at which the end part $35_P$ of the positive electrode segment $3_{Pseg}$ faces the end part $35_N$ of the negative electrode segment $3_{Nseg}$ in the Y direction. Accordingly, PM 8 is easily deposited and PM bridge parts 80 are forcedly formed on the part surrounded by the facing part 31.

As shown in FIG. 15, the facing part 31 has a length L which is longer than that of an average particle size of PM 8, and shorter than a width D between the positive electrode $3_P$ and the negative electrode $3_N$ in the Y direction.

A description will now be given of the effects of the PM detection sensor 1 according to the fourth exemplary embodiment with reference to FIG. 15 and FIG. 14.

As shown in FIG. 15 and FIG. 14, the end parts $35_N$ of the negative electrode segments $3_{Nseg}$ arranged adjacently to each other in the X direction are overlapped with the end parts $35_P$ of the positive electrode segments $3_{Pseg}$ in the Y direction. Similarly, the end parts $35_P$ of the positive electrode segment $3_{Pseg}$ arranged adjacently to each other in the X direction are overlapped with the end parts $35_N$ of the negative electrode segments $3_{Nseg}$ in the Y direction.

This arrangement structure previously described makes it possible to generate regions having a high electric field intensity between the end parts $35_P$ and $35_N$ of the positive electrode segment $3_{Pseg}$ and the negative electrode segment $3_{Nseg}$ only. This electrode arrangement makes it possible to reduce areas having a high electric field intensity, and to deposit PM 8 on narrow areas having the high electric field intensity on the deposition surface 20, and to increase the growth speed of PM bridge parts 80 on the deposition surface 20. The improved structure previously described makes it possible to enhance the detection sensitivity of the PM detection sensor 1 to detect an amount of PM 8 contained in exhaust gas Further, in the structure of the PM detection sensor 1 according to the fourth exemplary embodiment shown in FIG. 15, the end part $35_P$ of the positive electrode segment $3_{Pseg}$ in the X direction faces the end part $35_N$ of the negative electrode segment in the X direction in the $3_{Nseg}$ Y direction. This improved structure makes it possible to reduce the distance between the end parts $35_N$ and $35_P$, and to generate the electric fields having a high intensity between the end parts $35_N$ and $35_P$. This improved structure makes it possible to rapidly generate PM bridge parts 80 between the end parts $35_N$ and $35_P$ within a short period of time, and to enhance the detection sensitivity of the PM detection sensor 1.

Still further, in the structure shown in FIG. 15, the facing part 31 has the length L in the X direction is longer than the average particle size of PM 8, and shorter than the distance D between the positive electrode segment $3_{Pseg}$ and the negative electrode segment $3_{Nseg}$ in the Y direction.

In this improved electrode arrangement, because the length L of the facing part 31 in the X direction is longer than the average particle size of PM 8, it is possible to sufficiently deposit PM 8 on the facing part 31. Further, because the length L of the facing part 31 in the X direction is shorter than the distance D between the positive electrode segment $3_{Pseg}$ and the negative electrode segment $3_{Nseg}$ in the Y direction, this makes it possible to selectively deposit PM 8 on the narrow area of the deposition surface 20. This improved structure makes it possible to rapidly generate PM bridge parts 80 between the end parts $35_N$ and $35_P$ within a short period of time, and to enhance the detection sensitivity of the PM detection sensor 1.

The PM detection sensor according to the fourth exemplary embodiment has the same behavior and effects as the PM detection sensor according to the first exemplary embodiment.

The fourth exemplary embodiment provides the PM detection sensor 1 having the structure previously described in which both the end parts $35_P$ of the positive electrode segment $3_{Pseg}$ in the X direction face respectively with the end parts $35_N$ of the negative electrode segments $3_{Nseg}$ arranged adjacently to each other in the X direction in the Y direction. However, the concept of the present invention is not limited by this structure.

Figure 17:
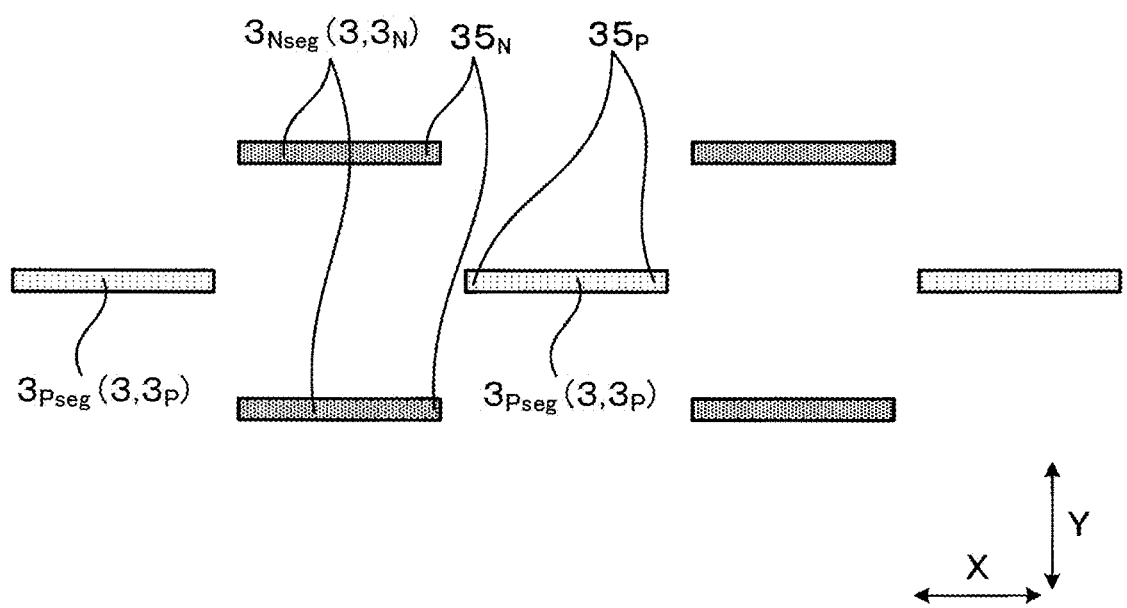
FIG. 17 is a partial enlarged view of the PM detection sensor according to the fourth exemplary embodiment in which positive electrode segments and negative electrode segments are not overlapped with each other in a Y direction.

FIG. 17 is a partial enlarged view of the PM detection sensor 1 according to the fourth exemplary embodiment in which the positive electrode segment $3_{Pseg}$ and the negative electrode segment $3_{Nseg}$ are not overlapped with each other in the Y direction. As shown in FIG. 17, it is possible for the PM detection sensor 1 according to the fourth exemplary embodiment to have another structure in which the end part $35_P$ of the positive electrode segment $3_{Pseg}$ in the X direction does not face the end part $35_N$ of the negative electrode segment $3_{Nseg}$ in the X direction in the Y direction. As shown in FIG. 17, in the Y direction, the overall area of the positive electrode segment $3_{Pseg}$ is arranged between the two negative electrode segments $3_{Nseg}$ adjacently to each other in the X direction. That is, no overlapped area is generated between the positive electrode segment $3_{Pseg}$ and the negative electrode segments $3_{Nseg}$ in the Y direction. In this electrode arrangement, the PM detection sensor according to the fourth exemplary embodiment has the same behavior and effects as the PM detection sensor according to the first exemplary embodiment.

Fifth Exemplary Embodiment

A description will be given of the PM detection sensor 1 according to the fifth exemplary embodiment with reference to FIG. 18.

Figure 18:
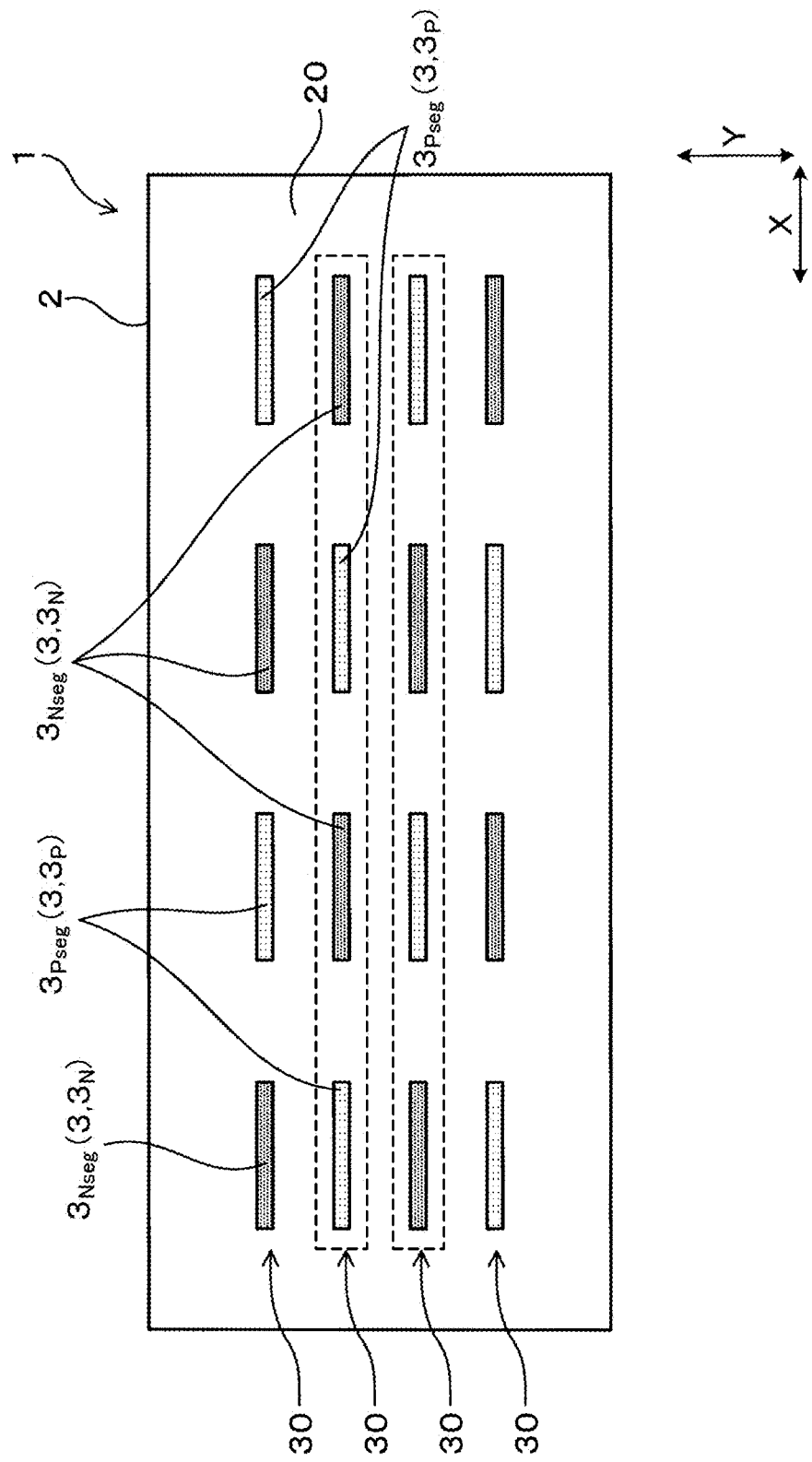
FIG. 18 is a plan view showing the PM detection sensor according to a fifth exemplary embodiment of the present invention.

FIG. 18 is a plan view showing the PM detection sensor 1 according to the fifth exemplary embodiment of the present invention. In the electrode arrangement shown in FIG. 18, the PM detection sensor 1 according to the fifth exemplary embodiment has another electrode arrangement in which each electrode segment has a linear shape, similar to the shape of each electrode segment in the PM detection sensor 1 according to the first exemplary embodiment. The positive electrode segments $3_{Pseg}$ and the negative electrode segments $3_{Nseg}$ are alternately arranged in the X direction and the Y direction to form the electrode groups 30. These electrode groups 30 are arranged respectively at predetermined intervals in the Y direction so that each positive electrode segment $3_{Pseg}$ faces the corresponding negative electrode segment $3_{Nseg}$ in the X direction.

In this electrode arrangement, the PM detection sensor according to the fifth exemplary embodiment has the same behavior and effects as the PM detection sensor according to the first exemplary embodiment.

Sixth Exemplary Embodiment

A description will be given of the PM detection sensor 1 according to the sixth exemplary embodiment with reference to FIG. 19.

Figure 19:
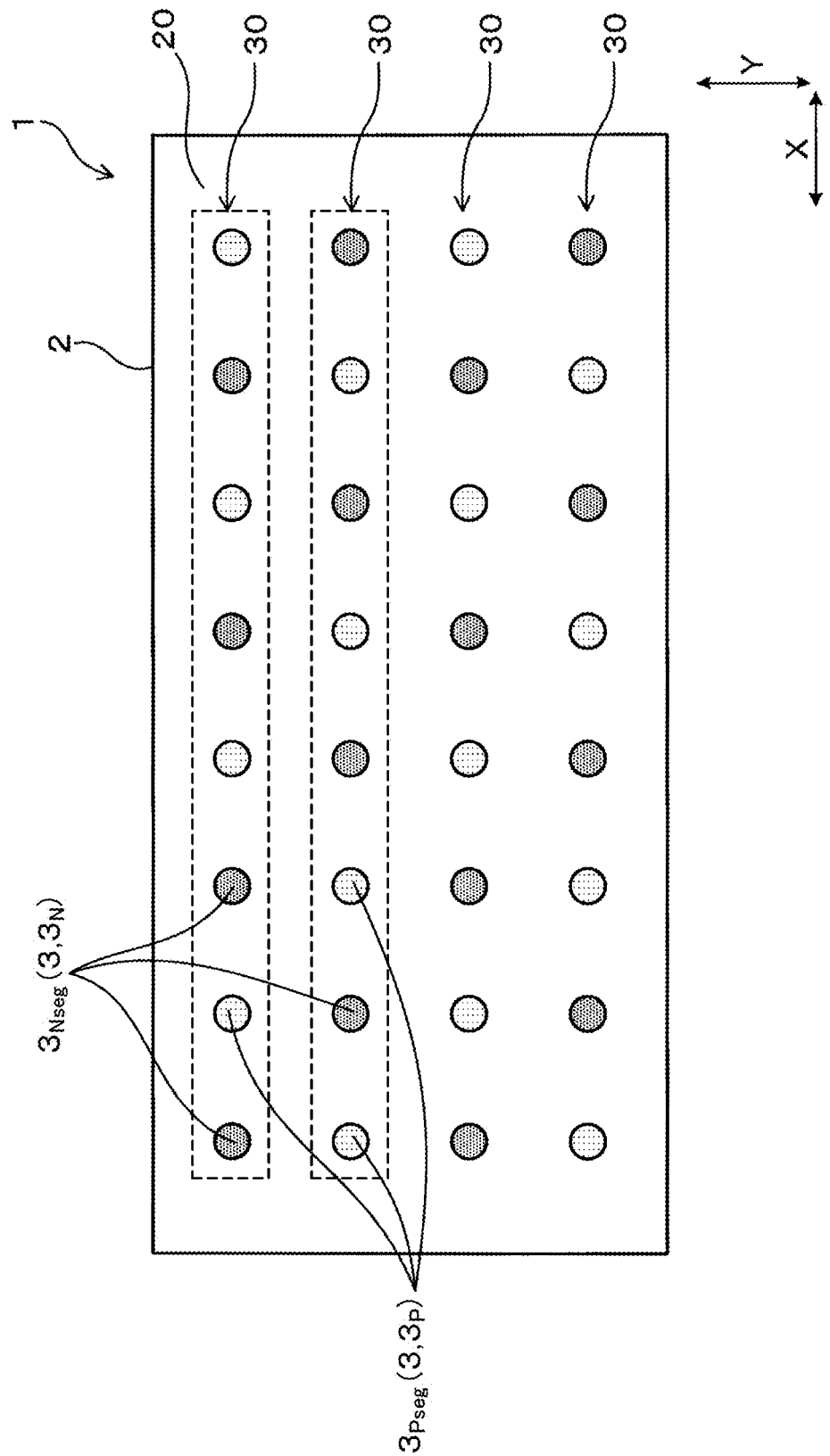
FIG. 19 is a plan view showing the PM detection sensor according to a sixth exemplary embodiment of the present invention.

FIG. 19 is a plan view showing the PM detection sensor 1 according to the sixth exemplary embodiment of the present invention. In the electrode arrangement shown in FIG. 19, each of the positive electrode segments $3_{Pseg}$ and the negative electrode segments $3_{Nseg}$ has a circular shape in the Z direction. That is, the positive electrode segments $3_{Pseg}$ and the negative electrode segments $3_{Nseg}$ are alternately arranged in a predetermined direction such as the X direction to form each of electrode groups 30. The electrode groups 30 are arranged in the Y direction at predetermined intervals so that each positive electrode segment $3_{Pseg}$ faces each negative electrode segment $3_{Nseg}$ in the Y direction. The Y direction is orthogonal to the X direction and orthogonal to the Z direction.

In this electrode arrangement, the PM detection sensor according to the sixth exemplary embodiment has the same behavior and effects as the PM detection sensor according to the first exemplary embodiment.

Seventh Exemplary Embodiment

A description will be given of the PM detection sensor 1 according to the seventh exemplary embodiment with reference to FIG. 20.

Figure 20:
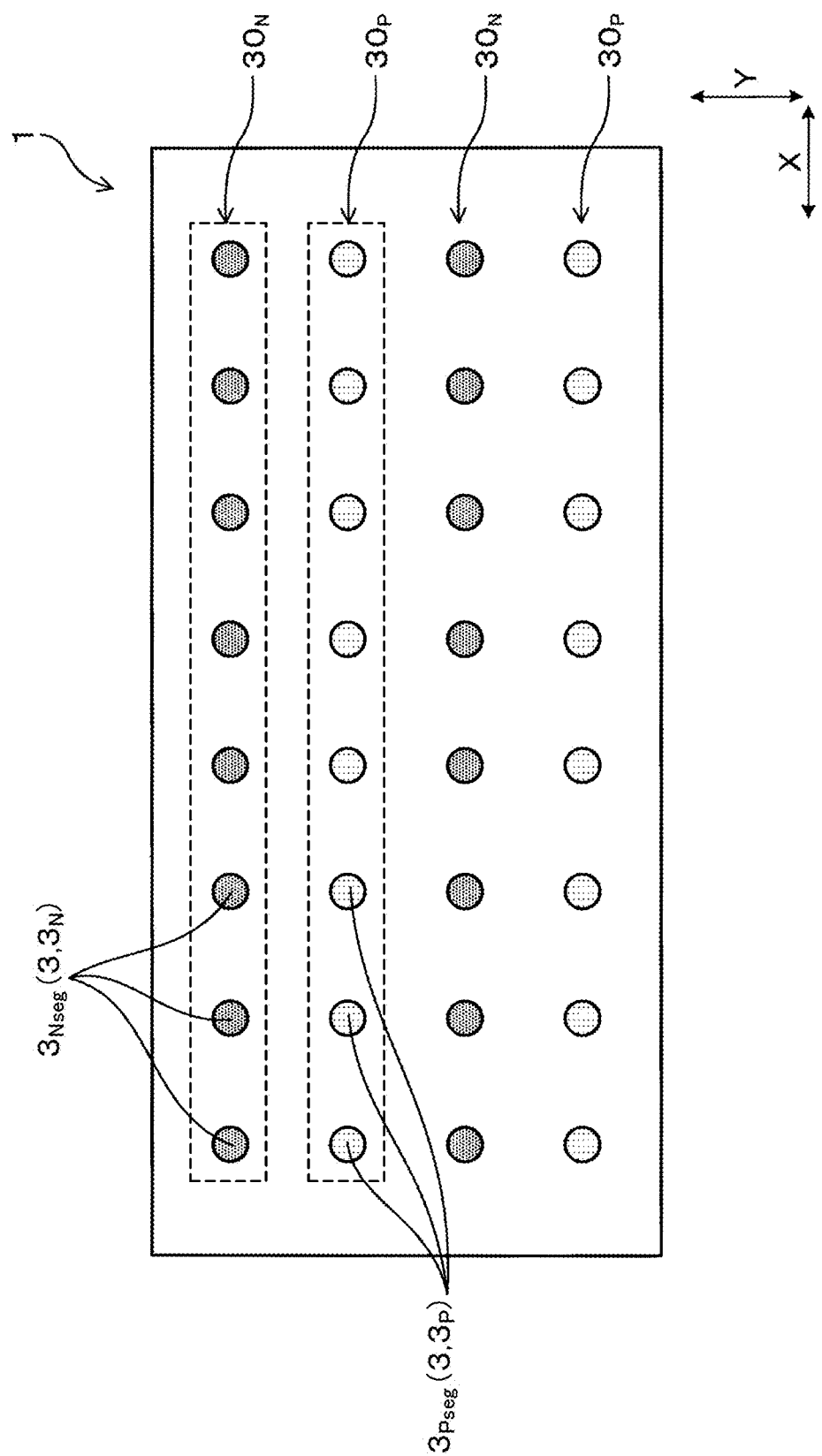
FIG. 20 is a plan view showing the PM detection sensor according to a seventh exemplary embodiment of the present invention.

FIG. 20 is a plan view showing the PM detection sensor 1 according to the seventh exemplary embodiment of the present invention. In the electrode arrangement shown in FIG. 20, the electrodes 3 are composed of the positive electrode segments $3_{Pseg}$ and the negative electrode segments $3_{Nseg}$. Each of the positive electrode segments $3_{Pseg}$ and the negative electrode segments $3_{Nseg}$ has a circular shape in the Z direction. The positive electrode segments $3_{Pseg}$ are arranged at regular intervals in a predetermined direction such as the X direction to form the positive electrode groups $30_P$. Similarly, the negative electrode segments $3_{Nseg}$ are arranged at the regular intervals in the predetermined direction such as the X direction to form the negative electrode groups $30_N$. Further, the positive electrode groups $30_P$ and the negative electrode groups $30_N$ are alternately arranged in the Y direction, which is orthogonal to the X direction and orthogonal to the Z direction.

In this electrode arrangement structure, the PM detection sensor according to the seventh exemplary embodiment has the same behavior and effects as the PM detection sensor according to the first exemplary embodiment.

Eighth Exemplary Embodiment

A description will be given of the PM detection sensor 1 according to the eighth exemplary embodiment with reference to FIG. 21.

Figure 21:
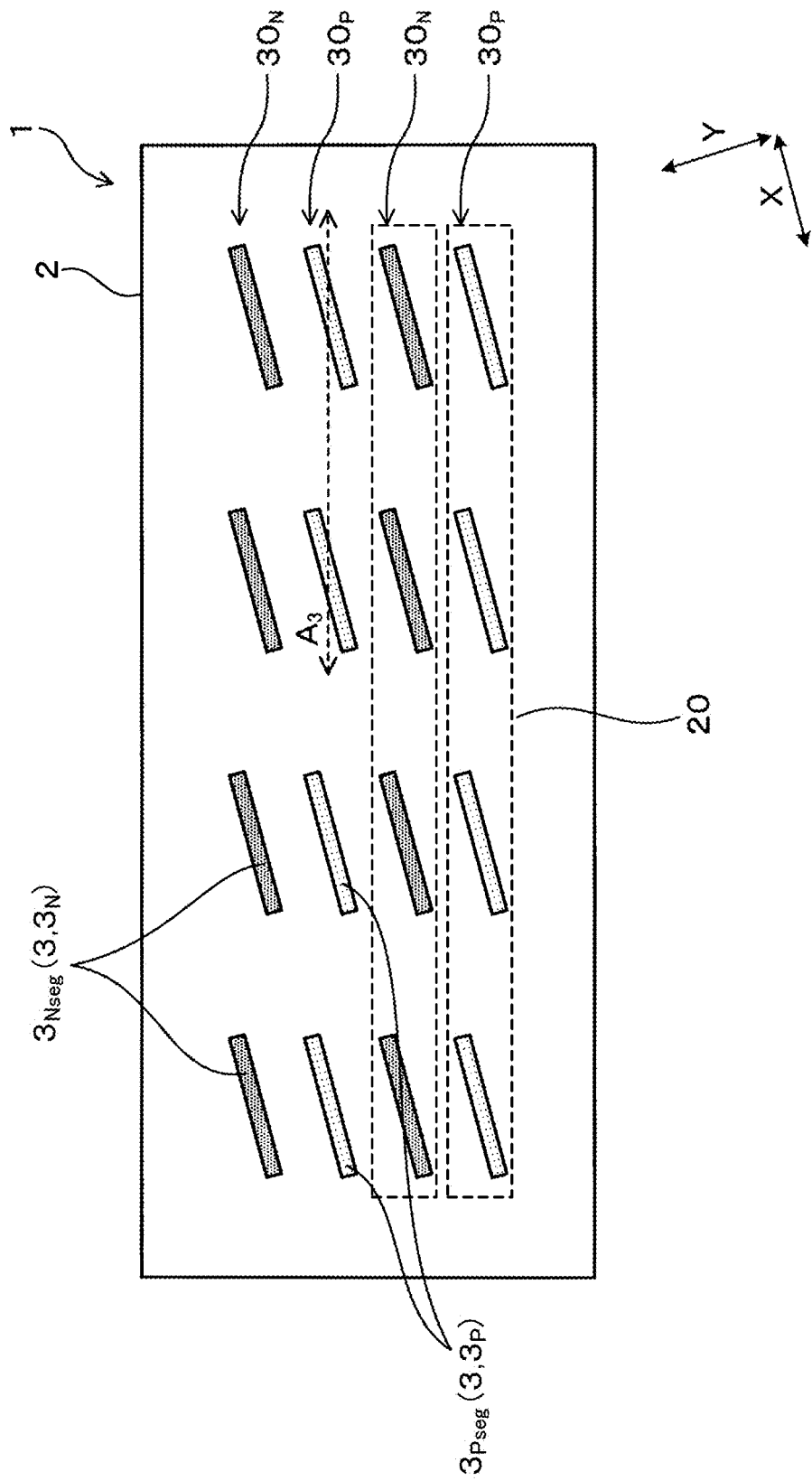
FIG. 21 is a plan view showing the PM detection sensor according to an eighth exemplary embodiment of the present invention.

FIG. 21 is a plan view showing the PM detection sensor according to the eighth exemplary embodiment of the present invention. In the electrode arrangement shown in FIG. 21, the electrodes 3 are composed of the positive electrode segments $3_{Pseg}$ and the negative electrode segments $3_{Nseg}$. The positive electrode segments $3_{Pseg}$ are arranged at regular intervals in a predetermined direction such as the X direction to form the positive electrode groups $30_P$. Similarly, the negative electrode segments $3_{Nseg}$ are arranged at the regular intervals in the predetermined direction such as the X direction to form the negative electrode groups $30_N$.

The long width direction (i.e. the X direction shown in FIG. 21) of each electrode segment does not coincide with the electrode arrangement direction $A_3$ in the electrode groups 30. Further, the positive electrode groups $30_P$ and the negative electrode groups $30_N$ are alternately arranged in the Y direction, which is orthogonal to the X direction and orthogonal to the Z direction, as shown in FIG. 21.

In this electrode arrangement, the PM detection sensor according to the eighth exemplary embodiment has the same behavior and effects as the PM detection sensor according to the first exemplary embodiment.

Ninth Exemplary Embodiment

A description will be given of the PM detection sensor 1 according to the ninth exemplary embodiment with reference to FIG. 22.

Figure 22:
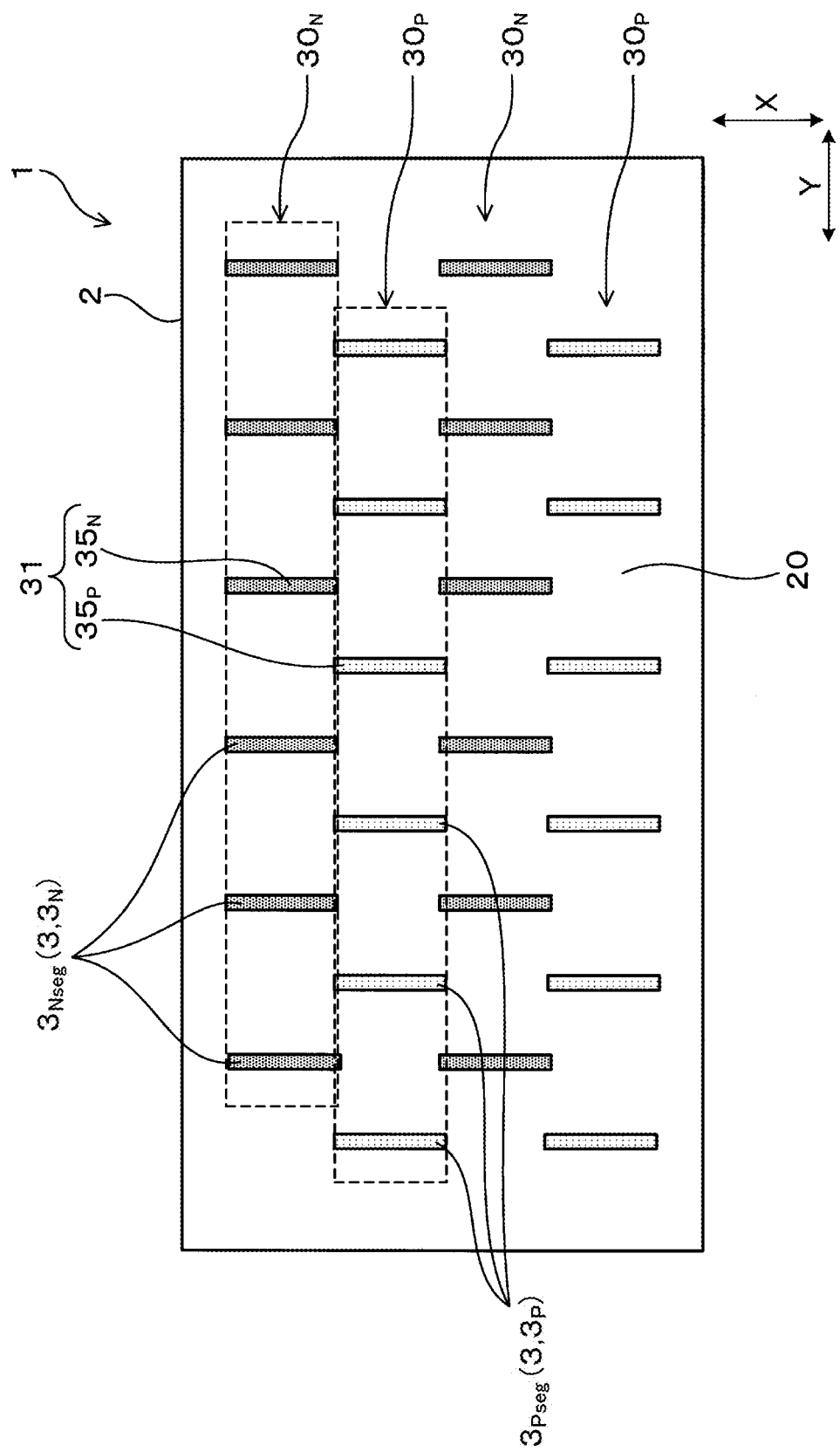
FIG. 22 is a plan view showing the PM detection sensor according to a ninth exemplary embodiment of the present invention.

FIG. 22 is a plan view showing the PM detection sensor according to the ninth exemplary embodiment of the present invention. In the electrode arrangement shown in FIG. 22, the positive electrode segments $3_{Pseg}$ are arranged in a short width direction thereof (i.e. along in the Y direction) to form the positive electrode groups $30_P$ in the Y direction. Similarly, the negative electrode segments $3_N$ are arranged in a short width direction thereof (i.e. along the Y direction) to form the positive electrode groups $30_P$ in the Y direction. Further, the positive electrode groups $30_P$ and the negative electrode groups $30_N$ are alternately arranged in the long width direction of each of the electrode segments (i.e. along the X direction). The end part $35_P$ of the positive electrode segment $3_{Pseg}$ faces the end part $35_N$ of the negative electrode segment $3_{Nseg}$ in the Y direction.

In this electrode arrangement, the PM detection sensor according to the ninth exemplary embodiment has the same behavior and effects of the PM detection sensor according to the first exemplary embodiment.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A particulate matter detection sensor capable of detecting an amount of particulate matter contained in exhaust gas, comprising:

a sensor body part made of an insulating member, a deposition surface being formed on a surface of the sensor body part;

two types of electrodes composed of a positive electrode and a negative electrode formed on the deposition surface to be exposed to exhaust gas as a detection target introduced into the particulate matter detection sensor, the positive electrode being composed of a plurality of positive electrode segments, and the negative electrode being composed of a plurality of negative electrode segments, the positive electrode segments and the negative electrode segments being adjacently arranged to each other on the deposition surface in a first direction and a second direction which are orthogonal to a normal direction of the deposition surface, a DC power source for applying, upon the particular matter being deposited on the deposition surface so that the deposited particulate matter electrically becomes a bridge between at least one of the positive electrode segments of the positive electrode and an adjacently-arranged one of the negative electrode segments of the negative electrode, a DC voltage between the at least one of the positive electrode segments and the adjacently-arranged one of the negative electrode segments to thereby cause a direct current to flow therebetween through the deposited particulate matter;

a current sensor for detecting a value of the direct current flowing between the at least one of the positive electrode segments and the adjacently-arranged one of the negative electrode segments through the deposited particulate matter;

a control part for calculating an amount of the deposited particulate matter on the deposition surface between the at least one of the positive electrode segments and the adjacently-arranged one of the negative electrode segments based on the value of the direct current detected by the current sensor, wherein each of the positive electrode segments and the negative electrode segments has a linear shape in a direction co-planar with the deposition surface, and the positive electrode segments and the negative electrode segments are arranged parallel to each other, and the plurality of positive electrode segments are arranged apart from each other, and the plurality of negative electrode segments are arranged apart from each other.

2. The particulate matter detection sensor according to claim 1, wherein the positive electrode segments and the negative electrode segments are arranged adjacently to each other in a long width direction of each of the positive electrode segments and the negative electrode segments, so as to form electrode groups, and the electrode groups are arranged adjacently to each other in a short width direction of each of the positive electrode segments and the negative electrode segments.

3. The particulate matter detection sensor according to claim 2, wherein the positive electrode segments are arranged adjacently to each other in the long width direction of each of the positive electrode segments to form positive electrode groups, the negative electrode segments are arranged adjacently to each other in the long width direction of each of the negative electrode segments to form negative electrode groups, and the positive electrode groups and the negative electrode groups are alternately arranged in the short width direction of each of the positive electrode segments and the negative electrode segments.

4. The particulate matter detection sensor according to claim 3, wherein in the short width direction of each of the positive electrode segments and the negative electrode segments, at least a part of the negative electrode segment is arranged between the two positive electrode segments adjacently arranged to each other and is overlapped with the two positive electrode segments in the short width direction of each of the negative electrode segments, and at least a part of the positive electrode segment is arranged between the two negative electrode segments adjacently arranged to each other and is overlapped with the two negative electrode segments in the long width direction of each of the positive electrode segments.

5. The particulate matter detection sensor according to claim 4, wherein an end part of each of the positive electrode segments in the long width direction of each of the positive electrode segments faces an end part of each of the negative electrode segments in the long width direction of each of the negative electrode segments.

6. The particulate matter detection sensor according to claim 5, wherein a length of a facing part in each of the positive electrode segments and the negative electrodes which face each other, in the long width part of each of the positive electrode segment and the negative electrode segment, is longer than an average particle size of particulate matter contained in exhaust gas, and is shorter than a distance between the facing part in the positive electrode segment and the facing part in the negative electrode segment in the short width direction of each of the positive electrode segment and the negative electrode segment.

7. The particulate matter detection sensor according to claim 1, wherein the positive electrode segments and the negative electrode segments are adjacently arranged to each other on the deposition surface in the first direction and the second direction respectively, the first direction and the second direction being orthogonal to a normal direction of the deposition surface.

\* \* \* \* \*